(12) United States Patent
Elliott et al.

(10) Patent No.: US 7,950,719 B2
(45) Date of Patent: May 31, 2011

(54) VEHICLE DUAL HINGE REAR DOOR ARTICULATING AND SLIDING SYSTEM

(75) Inventors: Adrian N. A. Elliott, Dearborn, MI (US); Justin T. Johnson, Dearborn, MI (US); Jason Falenski, Berkley, MI (US); Craig Blust, Oakland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 261 days.

(21) Appl. No.: 11/948,407

(22) Filed: Nov. 30, 2007

(65) Prior Publication Data

US 2009/0072583 A1 Mar. 19, 2009

Related U.S. Application Data

(60) Provisional application No. 60/972,555, filed on Sep. 14, 2007.

(51) Int. Cl.
*B60J 5/06* (2006.01)
(52) U.S. Cl. ....................................................... 296/155
(58) Field of Classification Search ............. 296/146.11, 296/146.12, 146.4, 155; 16/362, 364, 230, 16/231; 49/176, 246, 250, 254, 209, 216, 49/218
See application file for complete search history.

(56) References Cited

U.S. PATENT DOCUMENTS

| | | |
|---|---|---|
| 3,051,999 A | 9/1962 | Schimek |
| 3,075,803 A | 1/1963 | Wilfert |
| 3,313,063 A | 4/1967 | Patin |
| 3,619,853 A | 11/1971 | Merrill |
| 3,628,216 A | 12/1971 | Savell |
| 3,758,990 A | 9/1973 | Balanos |
| 3,935,674 A * | 2/1976 | Williams et al. ................. 49/212 |
| 4,025,104 A * | 5/1977 | Grossbach et al. ............ 296/155 |
| 4,135,760 A * | 1/1979 | Grossbach ..................... 296/155 |
| 4,719,665 A | 1/1988 | Bell |
| 4,945,677 A | 8/1990 | Kramer |
| 5,139,307 A | 8/1992 | Koops et al. |
| 5,251,953 A | 10/1993 | Willey |
| 5,398,988 A | 3/1995 | DeRees et al. |
| 5,474,344 A | 12/1995 | Lee |

(Continued)

FOREIGN PATENT DOCUMENTS

DE 3831698 A1 3/1990

(Continued)

*Primary Examiner* — H Gutman

(74) *Attorney, Agent, or Firm* — Gregory P. rown; Price, Heneveld, Cooper, deWitt & Litton, LLP

(57) ABSTRACT

A vehicle rear door articulating and sliding mechanism including an articulating hinge assembly having a hinge arm pivotally mounted to a vehicle C-pillar at one end thereof, and a vehicle rear door pivotally and slidably mounted to the hinge arm at an opposite end of the hinge arm. A guide track may be mounted to the rear door, and a slide block may be pivotally mounted to the hinge arm and slidably attached to the guide track. The hinge arm may be disposed at first and second angular positions relative to the guide track when the rear door is respectively disposed in closed and opened positions, and the slide block may be disposed at first and second positions along a length of the guide track when the rear door is respectively disposed in the closed and opened positions, to thus provide articulating and sliding movement of the rear door.

21 Claims, 22 Drawing Sheets

U.S. PATENT DOCUMENTS

| | | | |
|---|---|---|---|
| 5,507,119 A * | 4/1996 | Sumiya et al. | 49/218 |
| 5,561,887 A | 10/1996 | Neag et al. | |
| 5,685,046 A | 11/1997 | Neag et al. | |
| 5,812,684 A | 9/1998 | Mark | |
| 5,846,463 A | 12/1998 | Keeney et al. | |
| 5,896,704 A | 4/1999 | Neag et al. | |
| 5,921,613 A * | 7/1999 | Breunig et al. | 296/155 |
| 6,030,025 A | 2/2000 | Kanerva | |
| 6,036,257 A | 3/2000 | Manuel | |
| 6,183,039 B1 * | 2/2001 | Kohut et al. | 296/155 |
| 6,196,618 B1 | 3/2001 | Pietryga et al. | |
| 6,213,535 B1 | 4/2001 | Landmesser et al. | |
| 6,286,260 B1 * | 9/2001 | Grabowski | 49/216 |
| 6,299,235 B1 | 10/2001 | Davis et al. | |
| 6,305,737 B1 | 10/2001 | Corder et al. | |
| 6,328,374 B1 * | 12/2001 | Patel | 296/155 |
| 6,382,705 B1 | 5/2002 | Lang et al. | |
| 6,394,529 B2 | 5/2002 | Davis et al. | |
| 6,447,054 B1 | 9/2002 | Pietryga et al. | |
| 6,572,176 B2 | 6/2003 | Davis et al. | |
| 6,609,748 B1 | 8/2003 | Azzouz et al. | |
| 6,629,337 B2 | 10/2003 | Nania | |
| 6,793,268 B1 | 9/2004 | Faubert et al. | |
| 6,802,154 B1 | 10/2004 | Holt et al. | |
| 6,817,651 B2 | 11/2004 | Carvalho et al. | |
| 6,826,869 B2 | 12/2004 | Oberheide | |
| 6,860,543 B2 | 3/2005 | George et al. | |
| 6,896,315 B2 | 5/2005 | Batinli et al. | |
| 6,913,308 B2 | 7/2005 | Azzouz et al. | |
| 6,926,342 B2 | 8/2005 | Pommeret et al. | |
| 6,938,303 B2 | 9/2005 | Watson et al. | |
| 6,942,277 B2 | 9/2005 | Rangnekar et al. | |
| 6,997,504 B1 * | 2/2006 | Lang et al. | 296/146.11 |
| 7,000,977 B2 * | 2/2006 | Anders | 296/155 |
| 7,003,915 B2 | 2/2006 | Yokomori | |
| 7,032,953 B2 | 4/2006 | Rangnekar et al. | |
| 7,104,588 B2 | 9/2006 | George et al. | |
| 7,168,753 B1 | 1/2007 | Faubert et al. | |
| 7,178,853 B2 | 2/2007 | Oxley et al. | |
| 7,219,948 B2 | 5/2007 | Curtis, Jr. et al. | |
| 7,243,978 B2 | 7/2007 | Mather et al. | |
| 7,383,614 B2 | 6/2008 | Matsuki | |
| 7,393,044 B2 | 7/2008 | Enomoto | |
| 7,438,346 B1 | 10/2008 | Breed | |
| 7,469,944 B2 | 12/2008 | Kitayama et al. | |
| 7,552,953 B2 | 6/2009 | Schmoll et al. | |
| 7,611,190 B1 * | 11/2009 | Elliott et al. | 296/155 |
| 7,636,985 B2 | 12/2009 | Greenbank | |
| 7,640,627 B2 | 1/2010 | Lowen et al. | |
| RE41,143 E | 2/2010 | Rangnekar et al. | |
| 7,658,438 B1 * | 2/2010 | Elliott et al. | 296/155 |
| 7,765,740 B2 | 8/2010 | Heuel et al. | |
| 7,798,557 B2 * | 9/2010 | Elliott et al. | 296/146.12 |
| 2002/0096800 A1 | 7/2002 | Keeney et al. | |
| 2003/0218358 A1 * | 11/2003 | Hahn | 296/155 |
| 2005/0093337 A1 | 5/2005 | Herrmann et al. | |
| 2005/0116496 A1 | 6/2005 | Lowson et al. | |
| 2005/0146159 A1 | 7/2005 | Shen et al. | |
| 2006/0059799 A1 | 3/2006 | Zimmer et al. | |
| 2006/0103047 A1 | 5/2006 | Zwolinski | |
| 2006/0249983 A1 | 11/2006 | Heuel et al. | |
| 2006/0267375 A1 | 11/2006 | Enomoto | |
| 2007/0075565 A1 | 4/2007 | Magsaam | |
| 2007/0085374 A1 | 4/2007 | Mather et al. | |
| 2007/0214606 A1 | 9/2007 | Hoffman | |
| 2008/0190028 A1 | 8/2008 | Oxley | |
| 2008/0224501 A1 | 9/2008 | Zimmer et al. | |
| 2009/0000200 A1 | 1/2009 | Heuel et al. | |
| 2009/0051194 A1 * | 2/2009 | Elliott et al. | 296/146.11 |
| 2009/0070960 A1 | 3/2009 | Elliott et al. | |
| 2009/0072582 A1 | 3/2009 | Elliott et al. | |
| 2009/0072583 A1 * | 3/2009 | Elliott et al. | 296/155 |
| 2009/0200833 A1 | 8/2009 | Heuel et al. | |
| 2010/0127530 A1 * | 5/2010 | Elliott et al. | 296/146.11 |
| 2010/0154313 A1 | 6/2010 | Elliott et al. | |
| 2010/0171336 A1 * | 7/2010 | Elliott et al. | 296/146.12 |
| 2010/0295337 A1 * | 11/2010 | Elliott et al. | 296/202 |

FOREIGN PATENT DOCUMENTS

| | | | |
|---|---|---|---|
| DE | 102004039885 A1 * | 2/2006 | |
| EP | 0012511 A1 | 6/1980 | |
| EP | 0875434 A1 | 11/1998 | |
| EP | 0957019 A2 | 11/1999 | |
| EP | 1813759 A1 | 8/2007 | |
| GB | 389061 | 5/1931 | |
| JP | 3140583 A | 6/1991 | |
| JP | 3140584 A | 6/1991 | |
| JP | 2004175199 A | 6/2004 | |
| JP | 2005153738 A | 6/2005 | |
| JP | 2007138630 A | 6/2007 | |
| JP | 2008094323 A | 4/2008 | |
| KR | 100448753 B1 | 9/2004 | |
| WO | 0242589 A1 | 5/2002 | |
| WO | 2006005572 A1 | 1/2006 | |

* cited by examiner

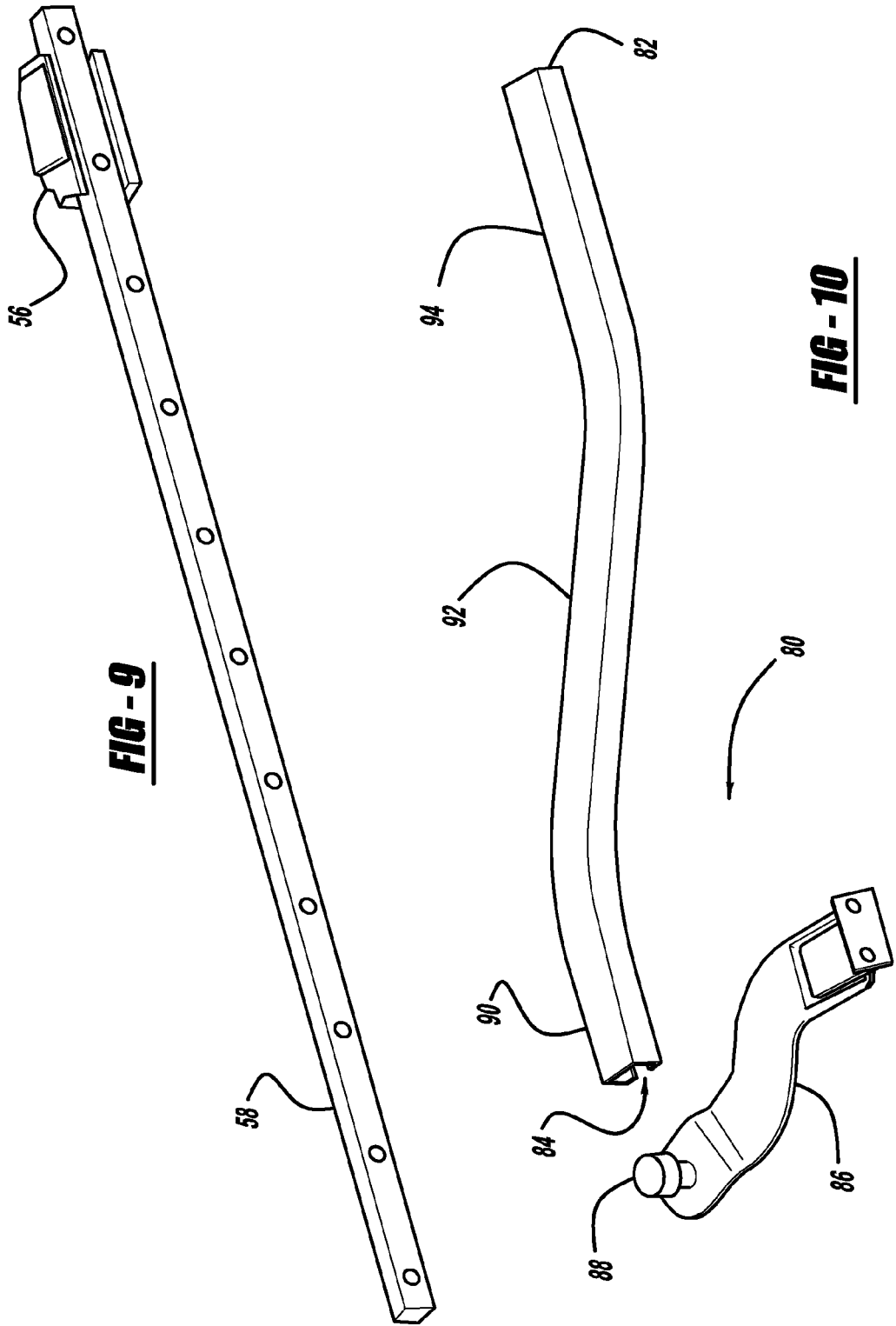

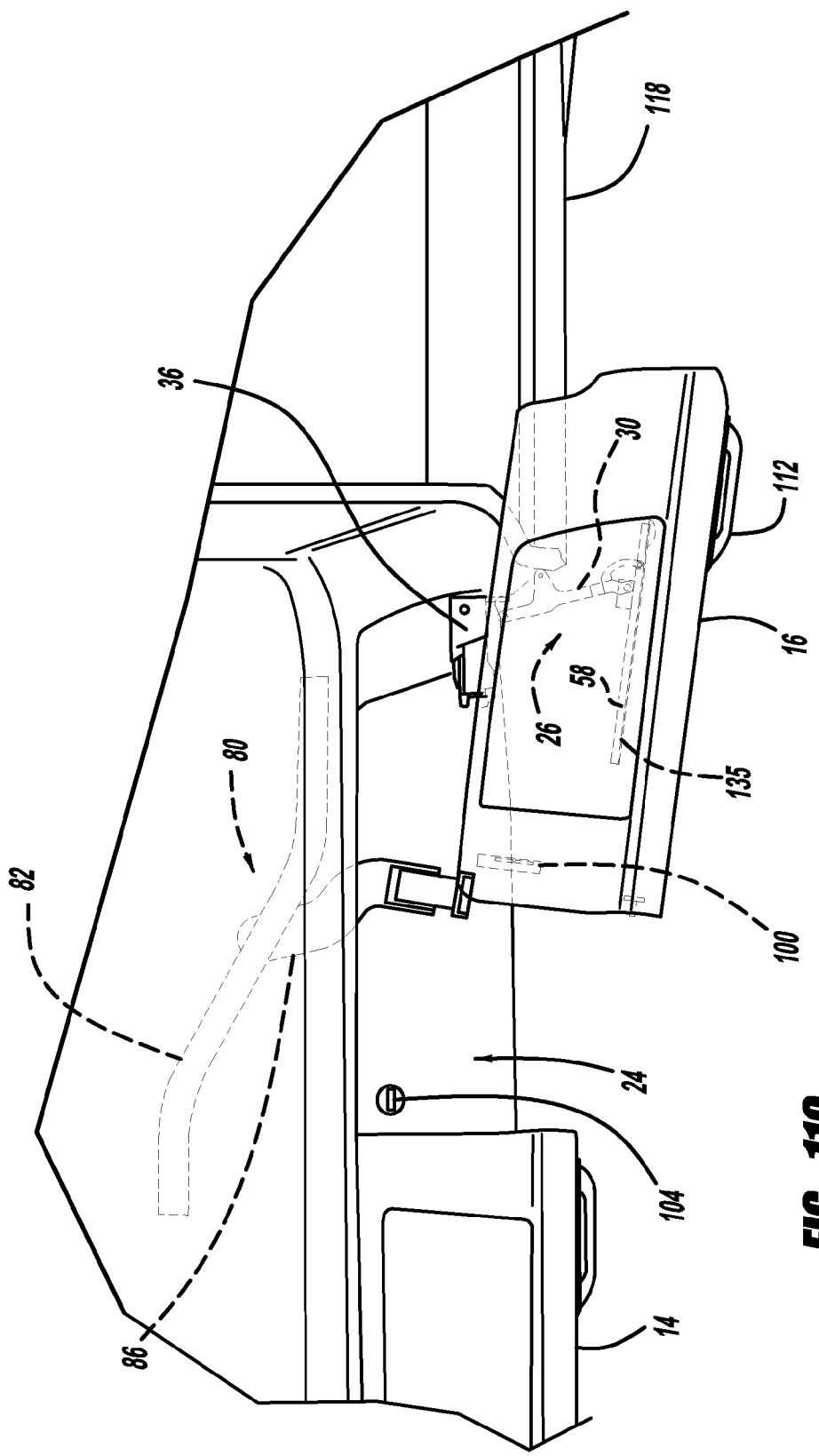

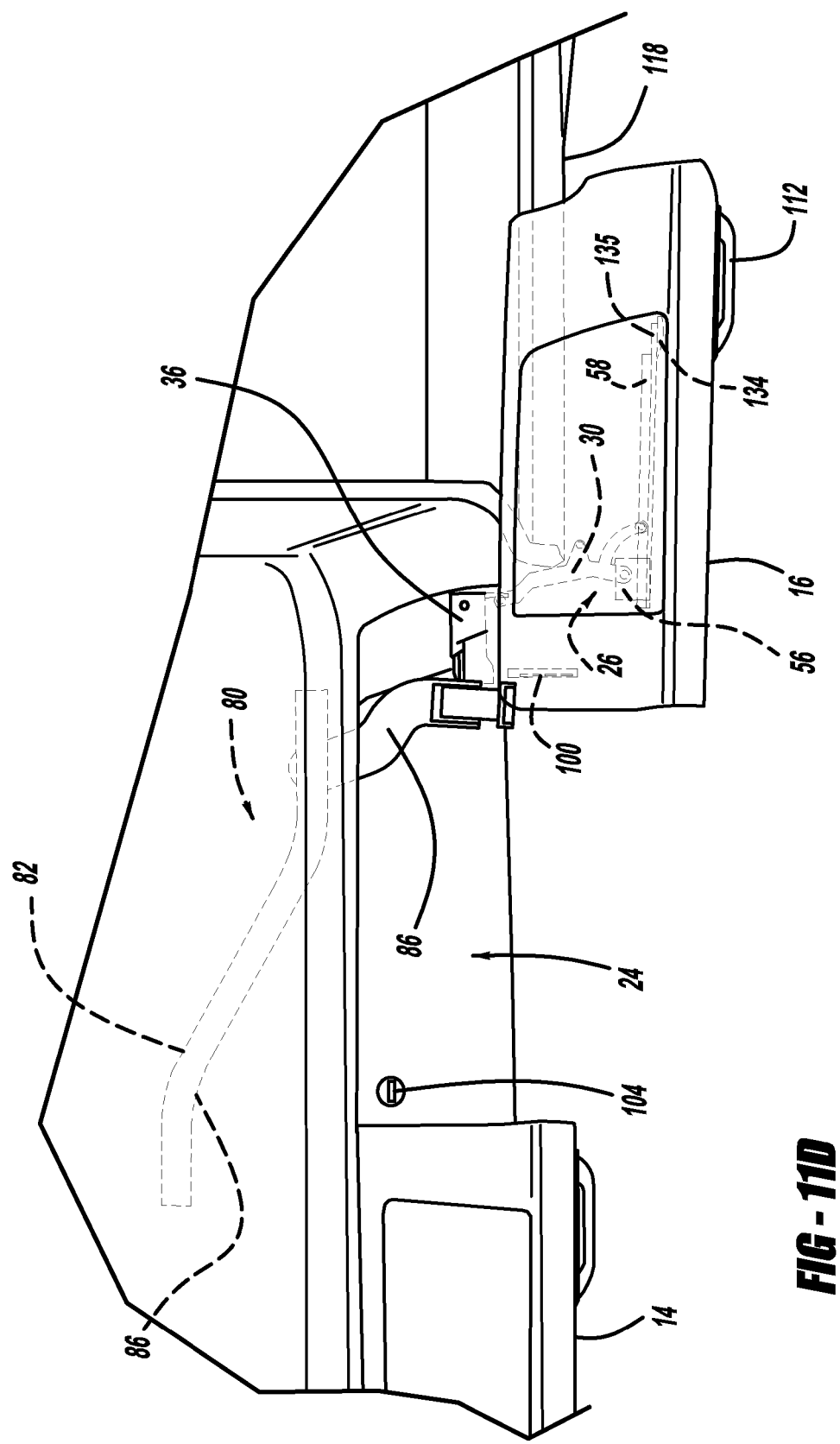

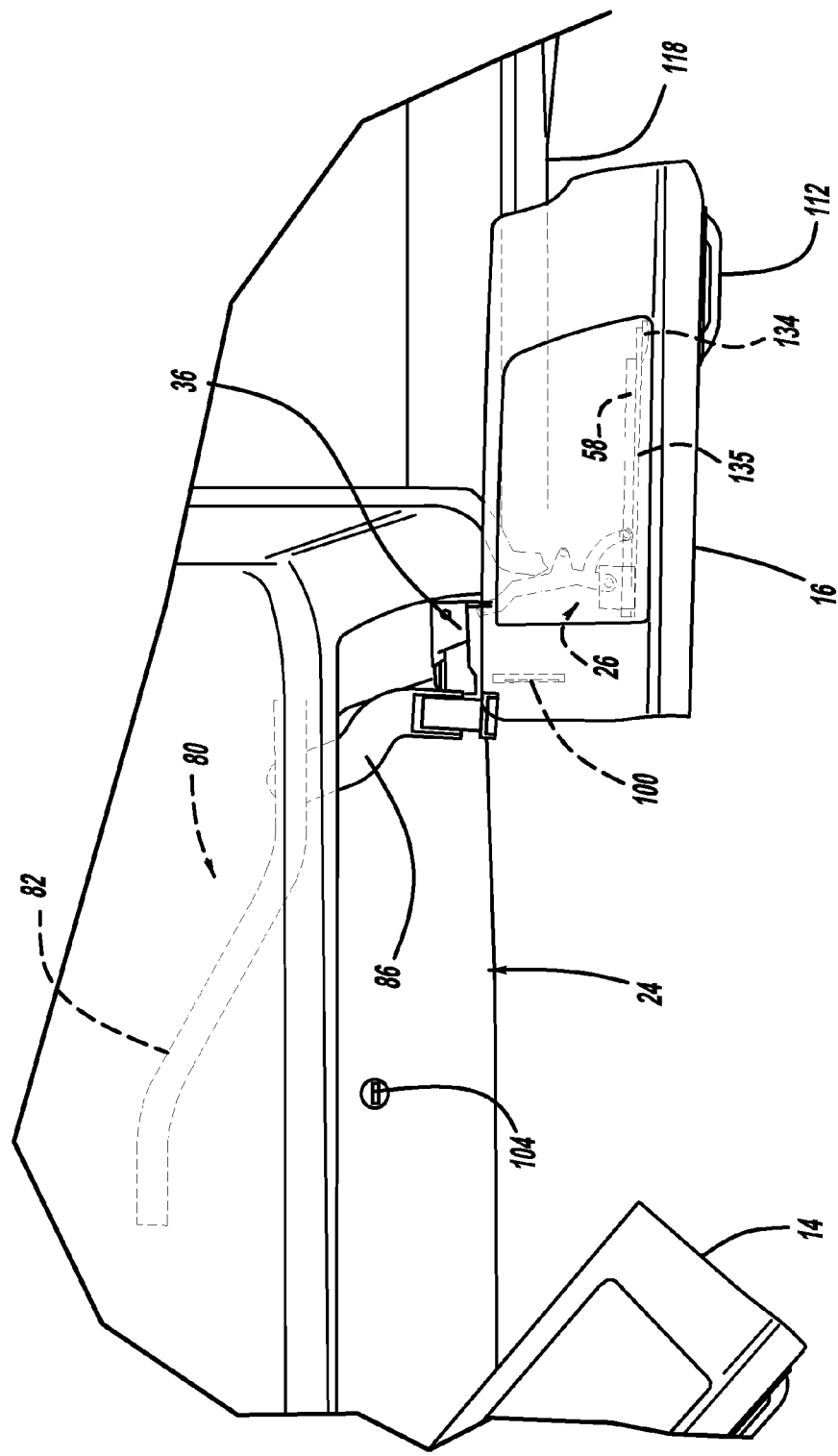

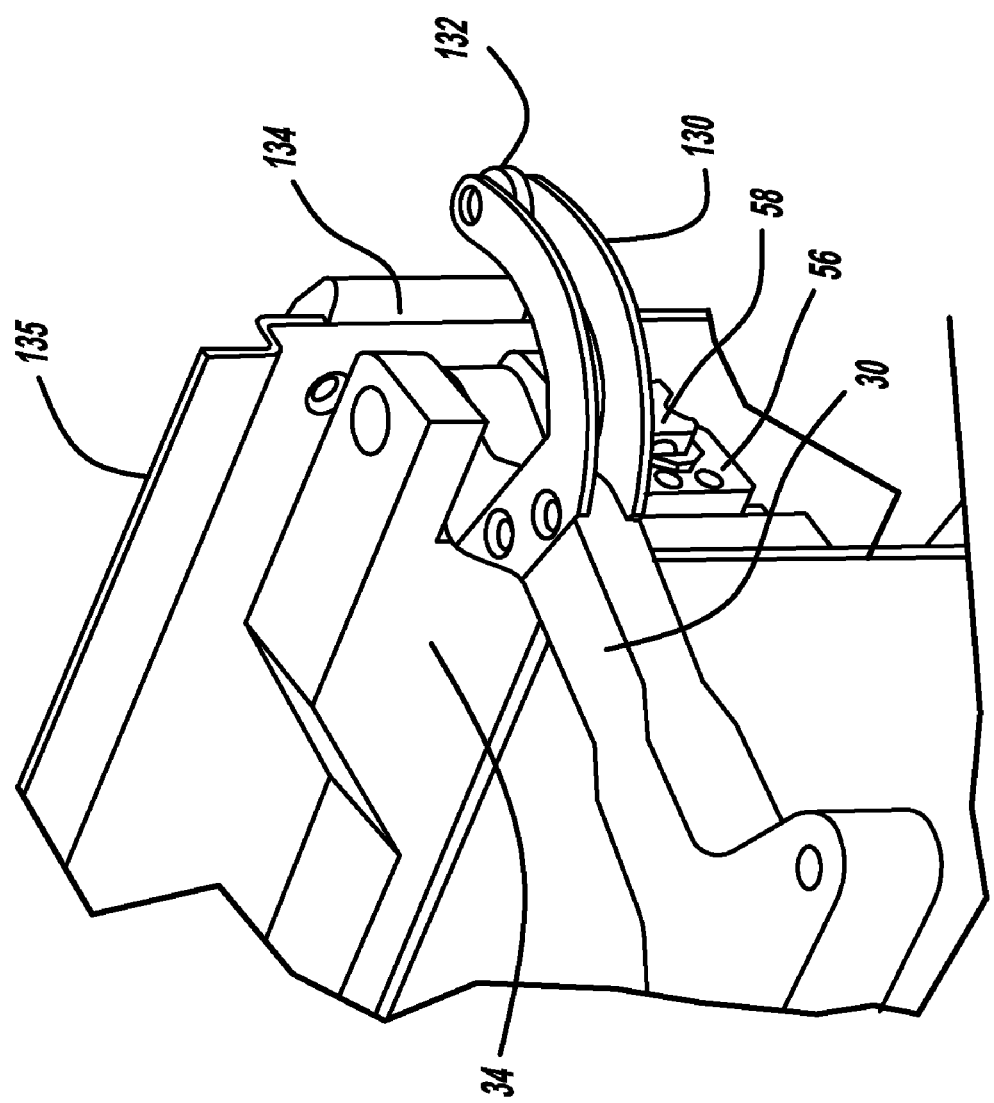

VEHICLE DUAL HINGE REAR DOOR ARTICULATING AND SLIDING SYSTEM

RELATED APPLICATIONS

This application claims benefit of priority of Provisional Application Ser. No. 60/972,555 filed Sep. 14, 2007, hereby incorporated by reference in its entirety.

BACKGROUND OF INVENTION a. Field of Invention

The invention relates generally to vehicle door movement control devices, and, more particularly, to a mechanism for vehicle rear door articulation and sliding, for example, in a pickup truck, with the mechanism permitting opening and closing of a rear door with or without a front door being opened.

b. Description of Related Art

As is known in the art, automobile designs are governed by a variety of ergonomic and operational factors. For doors and other such components, the design is generally based on ergonomic factors such as exterior appearance, and the location and visibility of hinges, latches and adjacent components, and operational factors such as the ingress/egress opening provided, the maximum clearance required for opening/closing a door, and crash performance.

For pickup trucks, sport-utility vehicles (SUVs) and other such vehicles which are designed to accommodate ingress/egress of several passengers and also provide means for transport of large goods, the ingress/egress opening and maximum clearance required for opening/closing a door can be of particular importance. For example, a typical pickup truck having front and back driver/passenger doors may include a C-pillar mounted rear door which pivots relative to the C-pillar in a similar manner as the A-pillar mounted front door to thus provide a relatively large and unobstructed ingress/egress opening without the intermediate B-pillar. Due to the large size of a typical pickup truck, driver/passenger ingress/egress can become particularly restrictive, if not impossible, if a vehicle is parked adjacent to the truck and is sufficiently close to prevent a person from boarding or loading to enter the area between the front and rear doors (when open), invariably known as parking lot entrapment.

In an effort to address such parking lot entrapment concerns a host of sliding or articulating rear door designs, such as the articulating rear door design disclosed in U.S. Pat. No. 6,447,054 to Pietryga, have been proposed.

Specifically, referring to FIGS. 2-7 of Pietryga, Pietryga discloses access door (18) connected to the body of vehicle (10) by hinge assembly (30) and arm assembly (32). Arm assembly (32) includes bracket (75) that attaches to body (22) and bracket (76) that attaches to access door (18). Brackets (75, 76) are each pivotally connected to arms (77, 78) by pins to form a four-bar linkage system. During opening movement of access door (18), pivot axis (89) moves along arc (93) about pivot axis (88), placing access door (18) at a position along the side of the exterior of body (22) substantially behind opening (19).

Thus while hinge assembly (30) and arm assembly (32) of Pietryga provide for articulating movement of access door (18), as readily apparent from FIGS. 2 and 7, hinge/arm assembly (30, 32) is readily visible when door (18) is open as it is required to be located generally centrally of opening (19). Referring to FIGS. 4-6, hinge/arm assembly (30, 32) is also relatively complex in design, and requires substantial modification of the vehicle structure for adequate operation thereof. Moreover, although hinge/arm assembly (30, 32) allows for articulated movement of door (18) adjacent vehicle body (22), due to the pivotal movement required of hinge/arm assembly (30, 32), the size of door (18) and thus opening (19) are restricted.

It would therefore be of benefit to provide a mechanism for permitting opening and closing of a rear door with or without a front door being opened, with the mechanism having limited visibility for thus minimally altering the overall appearance of a vehicle. It would also be of benefit to provide a mechanism which allows for articulated movement of a vehicle door adjacent the vehicle body, regardless of the size of the door, for thus providing a maximum ingress/egress opening. Yet further, it would also be of benefit to provide a mechanism which includes a minimal number of components for facilitating manufacture, assembly and operation of the overall mechanism and adjacent components.

SUMMARY OF INVENTION

The invention overcomes the drawbacks and deficiencies of prior art articulating door mechanisms by providing a vehicle rear door articulating and sliding mechanism including one or more articulating hinge assemblies having one or more hinge arms pivotally mounted to a vehicle C-pillar at one end thereof, and a vehicle rear door pivotally and slidably mounted to the hinge arm at an opposite end of the hinge arm. The mechanism may further include one or more guide tracks mounted to the vehicle rear door, and one or more slide blocks pivotally mounted to the hinge arm and slidably attached to the guide track. Based on the configuration above, the hinge arm may be disposed at first and second angular positions relative to the guide track when the vehicle rear door is respectively disposed in closed and opened positions, and the slide block may be disposed at first and second positions along a length of the guide track when the vehicle rear door is respectively disposed in the closed and opened positions. The vehicle rear door articulating and sliding mechanism thus provides articulating movement of the vehicle rear door, independent of a vehicle front door, during initial opening thereof and further provides sliding movement of the vehicle rear door relative to the vehicle body during continued opening thereof.

In an exemplary embodiment, the vehicle rear door articulating and sliding mechanism may include a dual hinge connected to the rear end of the door and for connection to a C-pillar of a vehicle body to allow the rear end (trailing edge) of the rear door to articulate open, through an arc representing approximately 110° (or between approximately 75° to 135°) relative to a vehicle A-B line, thereby drawing the front end (leading edge) away from the point of contact (interface) to the front door. The articulation allows the complete door assembly to be rotated clear of the door opening prior to commencement of a sliding motion in a rearward direction. A check may prevent rotation of the hinges beyond 110° and place the door in a position to slide. The sliding motion may be facilitated by means of a linear guideway, positioned horizontally, or at a preferred linear movement angle, which may involve a bearing pack and guide rails, conventional polymer wheels within a guiding track, or any other means of conveying the door in a fore-aft direction. The track for sliding may be packaged within the door, so that no external track on body is required. Stability of the door in both a fore and aft and in and out direction may be maintained through an upper guide packaged within the roof rail or cantrail and/or a lower guide mounted to the vehicle rocker. The door on closing may be guided using a track mounted on the vehicle roof and/or a front bottom surface of the door, for which a front striker may slide through this to engage a latch mounted at the rear of the track.

For the vehicle rear door articulating and sliding mechanism described above, the slide block may be pivotally mounted to the opposite end of the hinge arm. The opposite end of the hinge arm may further include a fixedly mounted curved check engageable with a complementary curved detent provided on the vehicle rear door for preventing sliding movement of the vehicle rear door. The curved check may be disengageable from the complementary curved detent for allowing articulating movement of the vehicle rear door. In a particular embodiment, the curved check may include a roller engageable with the complementary curved detent. In a particular embodiment, a surface of the hinge arm may be contiguously engageable with a surface of the slide block to limit pivotal movement of the hinge arm relative to the slide block. The vehicle rear door articulating and sliding mechanism may further include a guide assembly including a vehicle roof mounted guide track and a guide arm mounted to the vehicle rear door and having a follower slidable relative to the vehicle roof mounted guide track for facilitating guided movement of the vehicle rear door. Alternatively, the guide assembly may include a vehicle floor mounted guide track and a guide arm mounted to the vehicle rear door and having a follower slidable relative to the vehicle floor mounted guide track for facilitating guided movement of the vehicle rear door. The vehicle rear door articulating and sliding mechanism may further include a tie-rod connected to an upper and lower hinge arm for thereby providing rigidity for simultaneous operation of upper and lower hinge assemblies.

The invention also provides a vehicle door articulating and sliding mechanism including one or more articulating hinge assemblies including one or more hinge arms pivotally mounted to a vehicle body structure at one end thereof, and a vehicle door pivotally and slidably mounted to the hinge arm at an opposite end of the hinge arm. The mechanism may further include one or more guide tracks mounted to the vehicle door, and one or more slide blocks pivotally mounted to the hinge arm and slidably attached to the guide track. The hinge arm may be disposed at first and second angular positions relative to the guide track when the vehicle door is respectively disposed in closed and opened positions, and the slide block may be disposed at first and second positions along a length of the guide track when the vehicle door is respectively disposed in the closed and opened positions. The vehicle door articulating and sliding mechanism thus provides articulating movement of the vehicle door during initial opening thereof and further provides sliding movement of the vehicle door relative to the vehicle body during continued opening thereof.

For the vehicle door articulating and sliding mechanism described above, the mechanism may provide articulating movement of the vehicle door, independent of a vehicle adjacent door. The slide block may be pivotally mounted to the opposite end of the hinge arm, and the opposite end of the hinge arm may further include a fixedly mounted curved check engageable with a complementary curved detent provided on the vehicle door for preventing sliding movement of the vehicle door. The curved check may be disengageable from the complementary curved detent for allowing articulating movement of the vehicle door. In a particular embodiment, the curved check may include a roller engageable with the complementary curved detent. In a particular embodiment, a surface of the hinge arm may be contiguously engageable with a surface of the slide block to limit pivotal movement of the hinge arm relative to the slide block. The vehicle door articulating and sliding mechanism may further include a guide assembly including a vehicle roof mounted guide track and a guide arm mounted to the vehicle door and having a follower slidable relative to the vehicle roof mounted guide track for facilitating guided movement of the vehicle door. Alternatively, the guide assembly may include a vehicle floor mounted guide track and a guide arm mounted to the vehicle door and having a follower slidable relative to the vehicle floor mounted guide track for facilitating guided movement of the vehicle door. In a particular embodiment, the vehicle door articulating and sliding mechanism may further include a tie-rod connected to an upper and lower hinge arm for thereby providing rigidity for simultaneous operation of upper and lower hinge assemblies.

The invention yet further provides a vehicle compartment closure articulating and sliding mechanism including one or more articulating hinge assemblies including one or more hinge arms pivotally mounted to a vehicle body structure at one end thereof, and a compartment closure pivotally and slidably mounted to the hinge arm at an opposite end of the hinge arm. The mechanism may further include one or more guide tracks mounted to the compartment closure, and one or more slide blocks pivotally mounted to the hinge arm and slidably attached to the guide track. The hinge arm may be disposed at first and second angular positions relative to the guide track when the compartment closure is respectively disposed in closed and opened positions, and the slide block may be disposed at first and second positions along a length of the guide track when the compartment closure is respectively disposed in the closed and opened positions. The compartment closure articulating and sliding mechanism may thus provide articulating movement of the compartment closure during initial opening thereof and further provides sliding movement of the compartment closure relative to a vehicle body structure during continued opening thereof.

For the vehicle compartment closure articulating and sliding mechanism described above, the slide block may be pivotally mounted to the opposite end of the hinge arm, and the opposite end of the hinge arm may further include a fixedly mounted curved check engageable with a complementary curved detent provided on the compartment closure for preventing sliding movement of the compartment closure. The curved check may be disengageable from the complementary curved detent for allowing articulating movement of the compartment closure. In a particular embodiment, the curved check may include a roller engageable with the complementary curved detent. A surface of the hinge arm may be contiguously engageable with a surface of the slide block to limit pivotal movement of the hinge arm relative to the slide block. The mechanism may further include a tie-rod connected to parallel hinge arms for thereby providing rigidity for simultaneous operation of parallel hinge assemblies.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings:

FIG. 9 is an enlarged isometric view of a guide rail for facilitating sliding of the slide block of FIG. 7B attachable to the slide block mount of FIG. 7A;

FIG. 10 is an enlarged isometric view of a guide assembly for guiding articulating and sliding movement of a vehicle rear door;

FIGS. 11A-11D are top views of a vehicle including the rear door articulating and sliding mechanism of FIG. 1, respectively illustrating the rear vehicle door in a closed, just beginning to open, opened midway and fully opened positions, with the front vehicle door closed;

FIGS. 12A and 12B are top views of a vehicle including the rear door articulating and sliding mechanism of FIG. 1, respectively illustrating the rear vehicle door in a just beginning to open and fully opened positions, with the front vehicle door open;

FIGS. 14A-14D are isometric views illustrative of rotation of the hinge arm for selectively permitting articulation or sliding of the rear door;

DETAILED DESCRIPTION OF THE PREFERRED EMBODIMENTS

Figure 1:
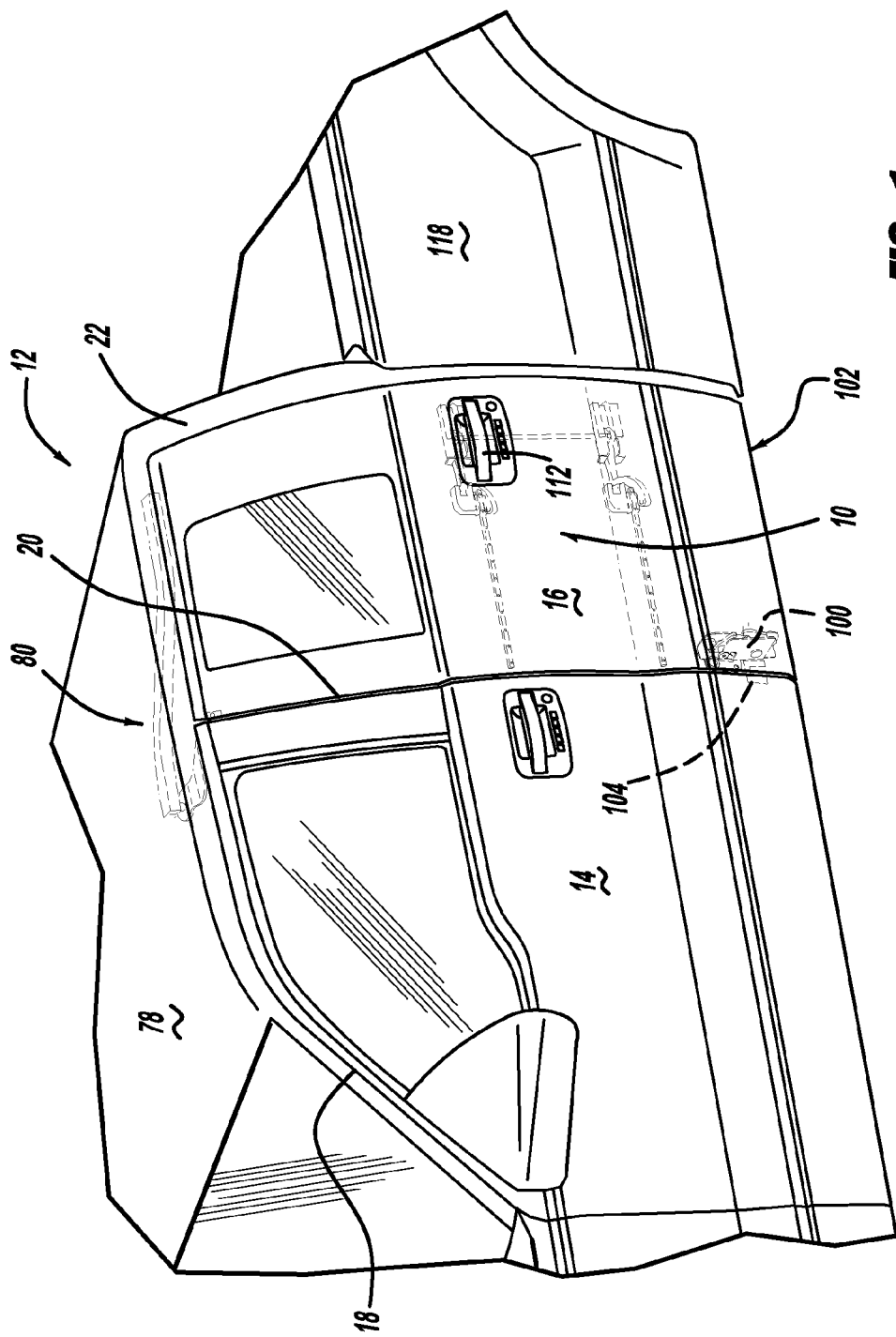
FIG. 1 is an isometric view of a rear door articulating and sliding mechanism according to the present invention, illustrating the mechanism in an assembled configuration and installed onto a vehicle (the mechanism being shown in hidden)

Referring now to the drawings wherein like reference numerals designate corresponding parts throughout the several views, FIGS. 1-16B illustrate a mechanism for vehicle rear door articulation and sliding according to the present invention, generally designated "rear door articulating and sliding mechanism 10."

Figure 2:
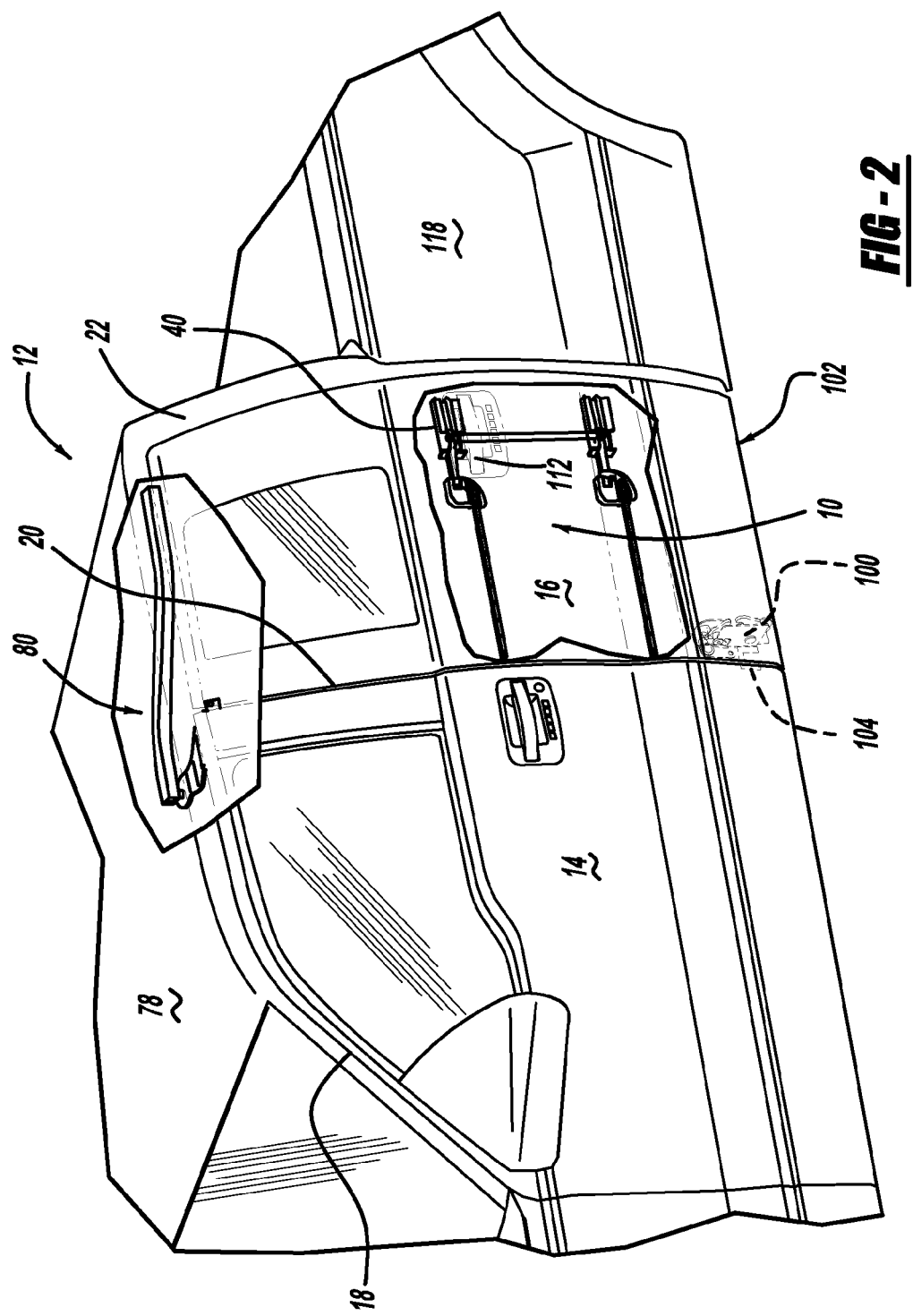
FIG. 2 is an isometric cutout view of the rear door articulating and sliding mechanism of FIG. 1, illustrating the mechanism installed onto a vehicle.
Figure 3:
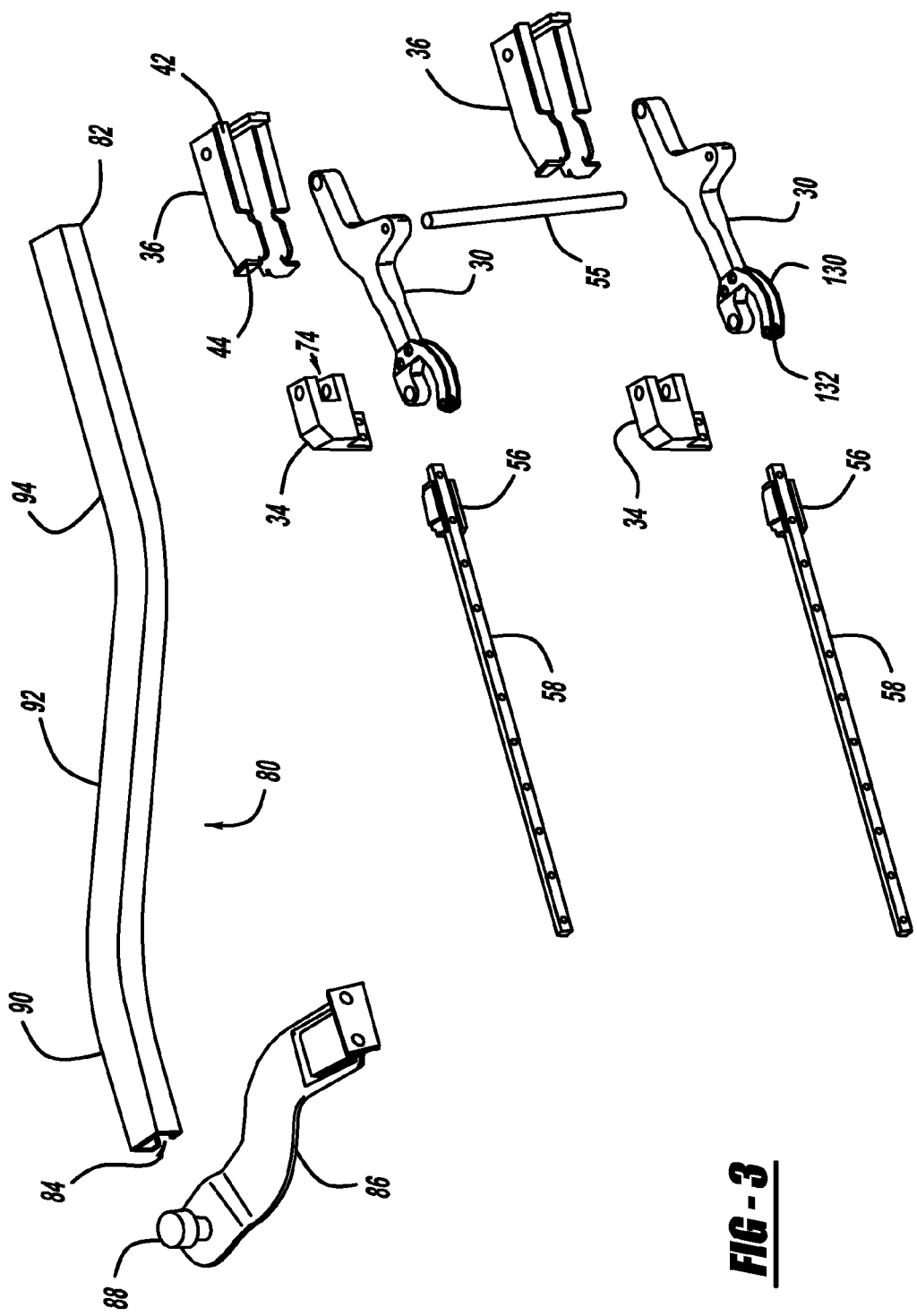
FIG. 3 is an exploded view of the rear door articulating and sliding mechanism of FIG. 1, illustrating the various sub-components of the mechanism.
Figure 4:
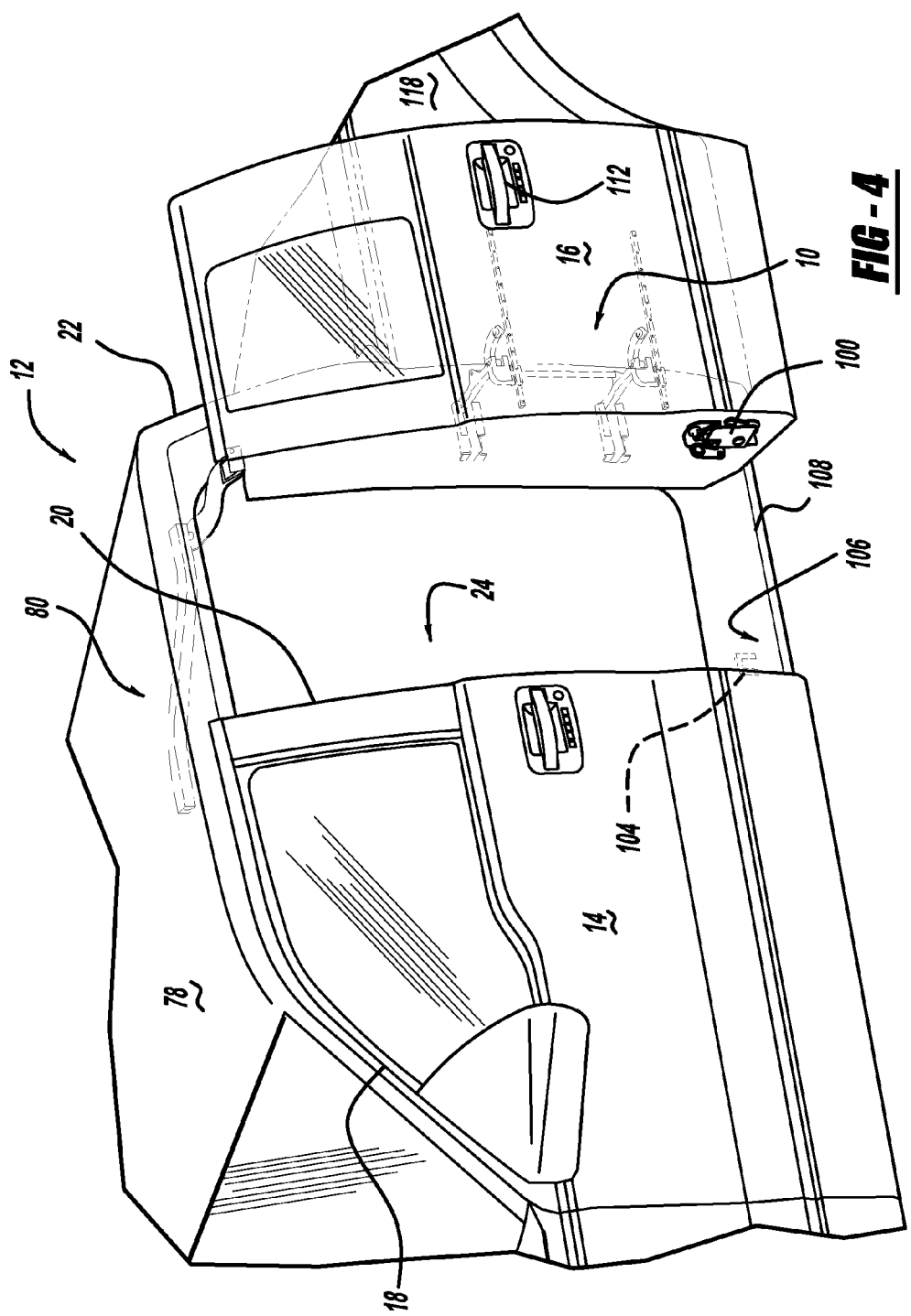
FIG. 4 is an isometric view of the rear door articulating and sliding mechanism of FIG. 1, illustrating the mechanism installed onto a vehicle and with a front vehicle door closed and a rear vehicle door fully opened.
Figure 5:
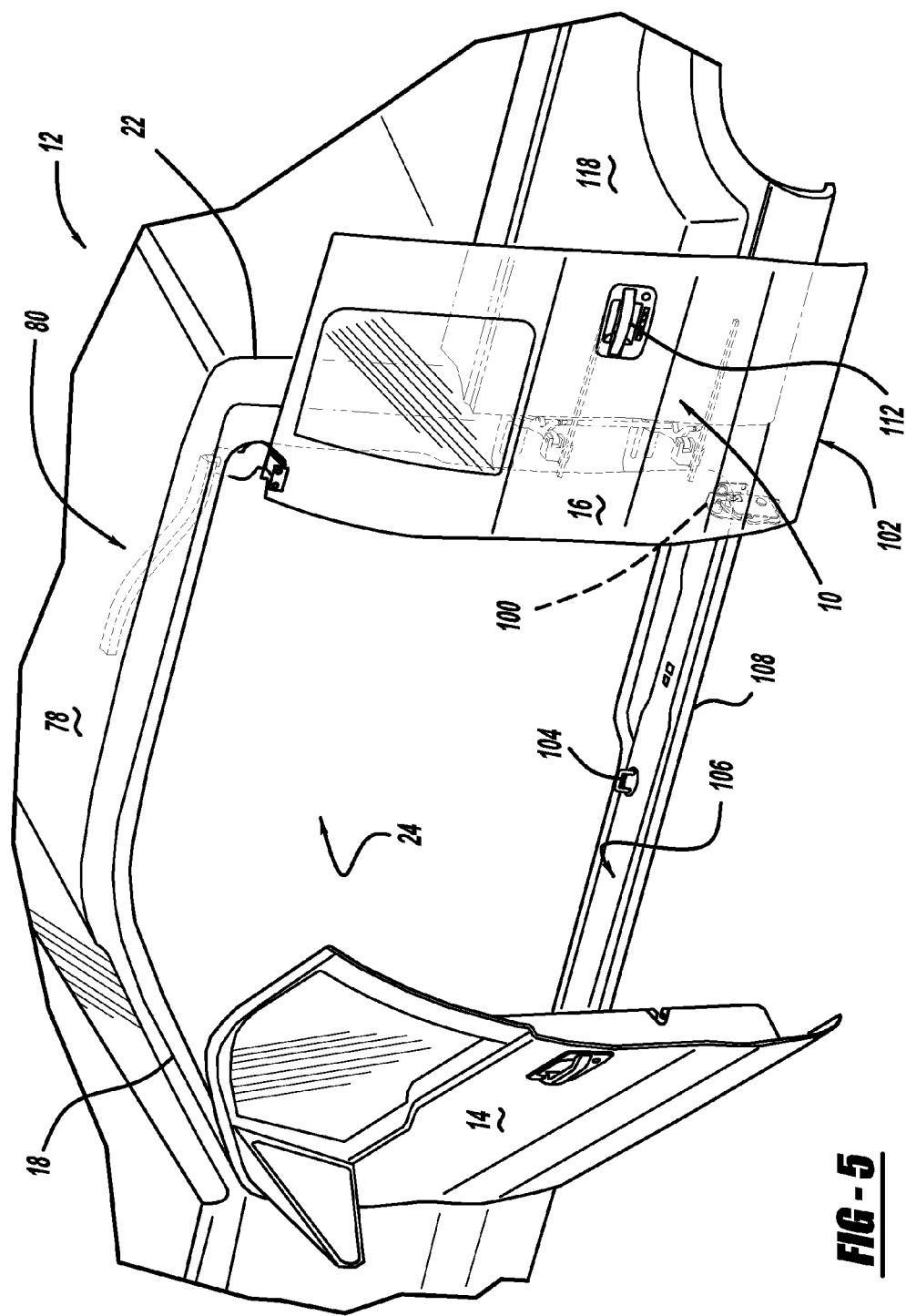
FIG. 5 is an isometric view of the rear door articulating and sliding mechanism of FIG. 1, illustrating the mechanism installed onto a vehicle and with the front and rear vehicle doors fully opened.
Figure 6:
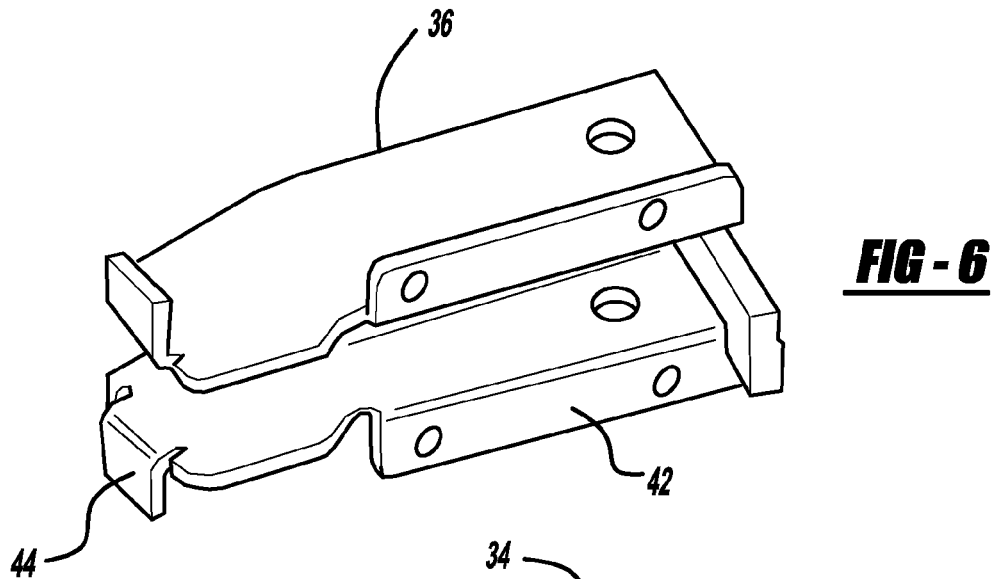
FIG. 6 is an enlarged isometric view of a hinge mount for attachment of the rear door articulating and sliding mechanism of FIG. 1 to a vehicle C-pillar.
Figure 7A:
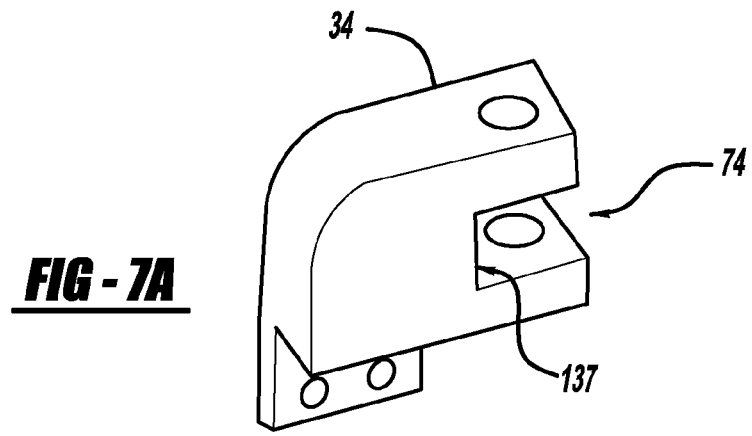
FIG. 7A is an enlarged isometric view of a slide block mount for attachment of a hinge arm to a slide block for facilitating sliding of a rear vehicle door.
Figure 7B:
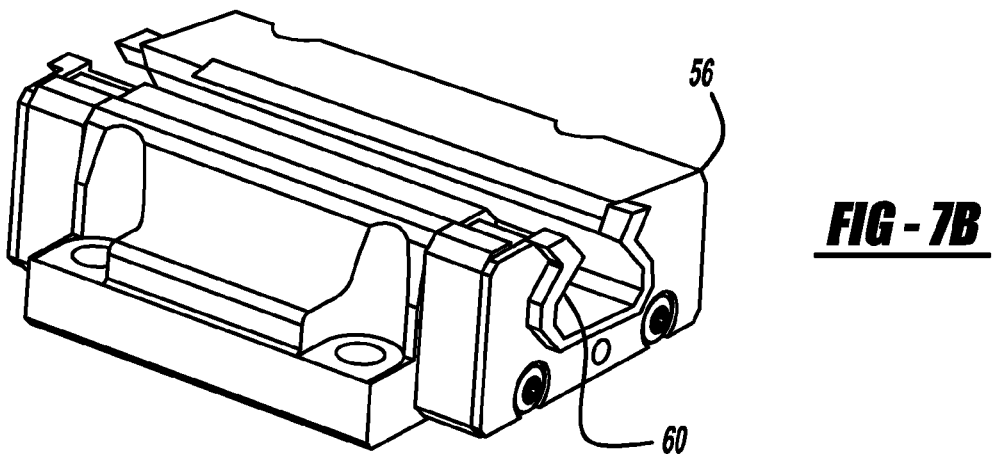
FIG. 7B is an enlarged isometric view of a slide block for attachment of a hinge arm via the slide block mount of FIG. 7A for facilitating sliding of a rear vehicle door.

Referring to FIGS. 1-3, rear door articulating and sliding mechanism 10 may generally be mounted onto a vehicle 12 including front and rear doors 14, 16. In the exemplary embodiment illustrated, vehicle 12 may be a pickup truck including A, B and C pillars 18, 20, 22. As shown in FIGS. 4 and 5, and described in greater detail below, in order to facilitate ingress and egress into and from compartment 24 of vehicle 12, rear door articulating and sliding mechanism 10 may allow for complete opening of rear door 16, with front door 14 being fully opened or closed.

The various sub-components of rear door articulating and sliding mechanism 10 will now be described in detail with reference to FIGS. 1-10.

Specifically, as shown in FIGS. 1-3, rear door articulating and sliding mechanism 10 may generally include an articulating hinge assembly 26 pivotally mounted at end 28 of a hinge arm 30 to C-pillar 22 and further pivotally mounted at end 32 of hinge arm 30 to a slide block mount 34. Those skilled in the art would readily appreciate in view of this disclosure that mechanism 10 may be installed onto a vehicle D-pillar (not shown), or another body structure for facilitating articulated and sliding opening/closing of a door or another cover. As shown in FIGS. 1-3, a hinge mount 36 may include a pivot pin 38 onto which hinge arm 30 pivotally rotates. Hinge mount 36 may further be located in a cutout 40 provided in C-pillar 22. As shown in FIGS. 1-3, in an exemplary embodiment, hinge mount 36 may include first and second mounts 42, 44 for attachment to C-pillar 22 by means of riveting, welding and the like.

Figure 8:
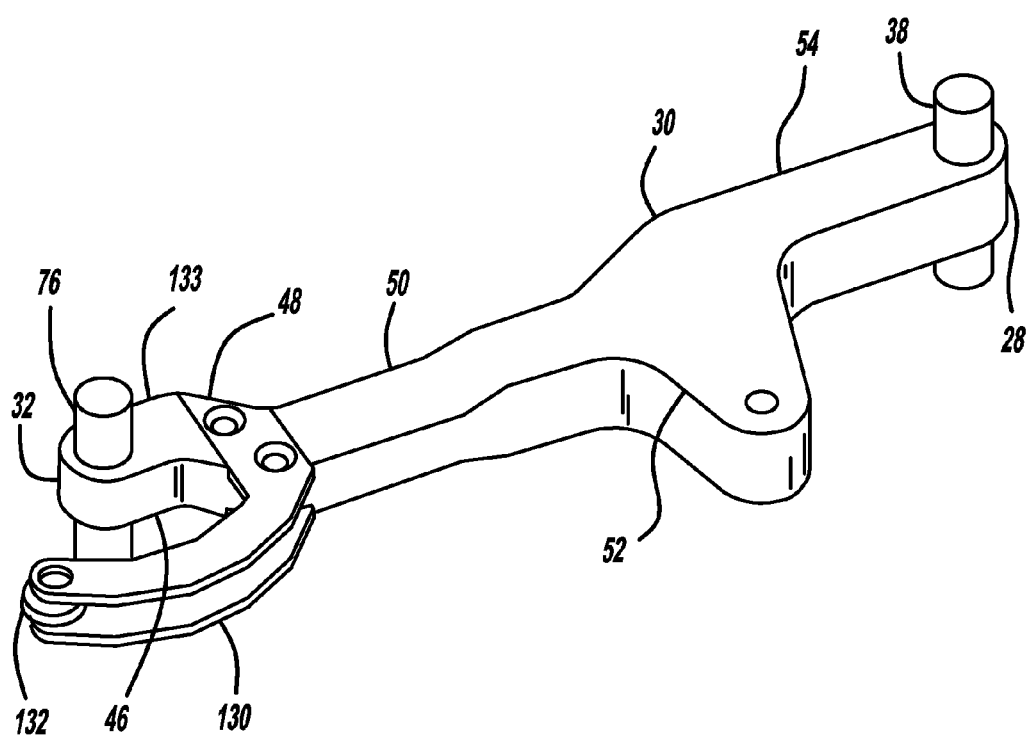
FIG. 8 is an enlarged isometric view of a hinge arm for controlling pivotal movement of a rear vehicle door.

Referring next to FIGS. 3 and 8, in the exemplary embodiment illustrated, each hinge arm 30 may include a curved profile generally including curved sections 46, 48, 50, 52 and 54 for facilitating predetermined articulation of rear door 16. As readily evident to those skilled in the art in view of this disclosure, hinge arm 30 may be shaped in a variety of configurations based on the articulation requirements of rear door 16, and the orientation of door 16 relative to C-pillar 22. Section 52 of hinge arm 30 may protrude outwardly for providing an attachment structure for a tie-rod 55, which as shown in FIGS. 1 and 3, provides rigidity for simultaneous operation of the upper and lower hinge assemblies 26. Hinge arm 30 may further include a curved check 130 including roller 132 engageable with complementary curved detent 134 mounted on frame member 135 for selectively controlling articulation/sliding of assembly 26, as discussed in greater detail below.

Referring again to FIGS. 1-3, a slide block 56 may be pivotally mounted on end 32 of each hinge arm 30 via slide block mount 34 for sliding relative to guide tracks 58 attached to rear door 16. In the exemplary embodiment illustrated, the sliding motion of slide blocks 56 is facilitated by means of guide tracks 58 which may include a bearing pack 60 provided on the underside of slide blocks 56 for rolling engagement with guide tracks 58, or alternatively, against polymer wheels disposable within the guide track. Those skilled in the art would readily appreciate in view of this disclosure that other means for facilitating sliding of slide blocks 56 relative to guide tracks 58 may be used as needed without departing from the scope of the invention. For example, referring to FIGS. 15A, 15B, 16A and 16B, these figures illustrate alternative embodiments of the aforementioned slide arrangements for facilitating sliding of rear door 16. Specifically, referring to FIGS. 15A and 15B, instead of slide blocks 56 and guide tracks 58, a slide block 62 including bearings may be disposed substantially within guide track 64 for sliding against grooves 66. Alternatively, referring to FIGS. 16A and 16B, a guide track 68 may include a slide block 70 having polymer coated wheels 72 for facilitating the sliding action. As discussed above, slide blocks 56 may be connected to slide block mounts 34 which include a complementary slot 74 for engagement with hinge arms 30 via pivot pins 76.

Referring to FIGS. 1-3, guide tracks 58 may generally be formed as linear tracks for supporting slide blocks 56 and permitting relative movement thereof. As shown in FIG. 1, in the particular embodiment illustrated, articulating hinge assembly 26 may include two parallel guide tracks 58 provided for supporting rear door 16, likewise with two parallel hinge arms 30 pivotally connected to slide blocks 56 and hinge mount 36, with hinge arms 30 being further connected to each other by tie-rod 55 as discussed above. Those skilled in the art would however readily appreciate in view of this disclosure that articulating hinge assembly 26 may include additional or fewer components based on the stability requirements and size of rear door 16 and related components.

As shown in FIG. 1, rear door articulating and sliding mechanism 10 may further include an upper guide assembly 80 including guide track 82 mounted to roof structure 78. In the particular embodiment illustrated, guide track 82 may include an opening 84 for facilitating guided movement of a guide arm 86 having follower 88 slidably disposed in opening 84. Guide track 82 may further include sections 90, 92 and 94 for controlling articulation or sliding of door 16. In this manner, whereas articulating hinge assembly 26 controls pivotal and sliding movement of rear door 16, upper guide assembly 80 further guides movement of door 16 during opening/closing thereof, and further prevents articulation of door 16 when door 16 is sliding via guide tracks 58 and 82 along sections 90 or 94 of guide track 82 or sliding of door 16 when door 16 is articulating along section 92 of guide track 82.

In order to latch/unlatch rear door 16, door 16 may include a latch 100 provided at lower end 102 thereof and engageable with a striker 104 provided at lower end 106 of door opening frame 108. Latch 100 may be operable via release handle 112 in a conventional manner. As readily evident, in order to efficiently open and close door 16, handle 112 may be a pull-type handle as shown, whereby a user may grasp onto handle 112 and pull rear door 16 to open or close the door as needed.

The opening/closing of rear door 16 will now be described in detail with reference to FIGS. 1-13B (especially FIGS. 4-13B).

Referring to FIGS. 4 and 5, as discussed above, in order to facilitate ingress and egress into and from compartment 24 of vehicle 12, rear door articulating and sliding mechanism 10 may allow for complete opening of rear door 16, with front door 14 being fully opened or closed.

Figure 11A:
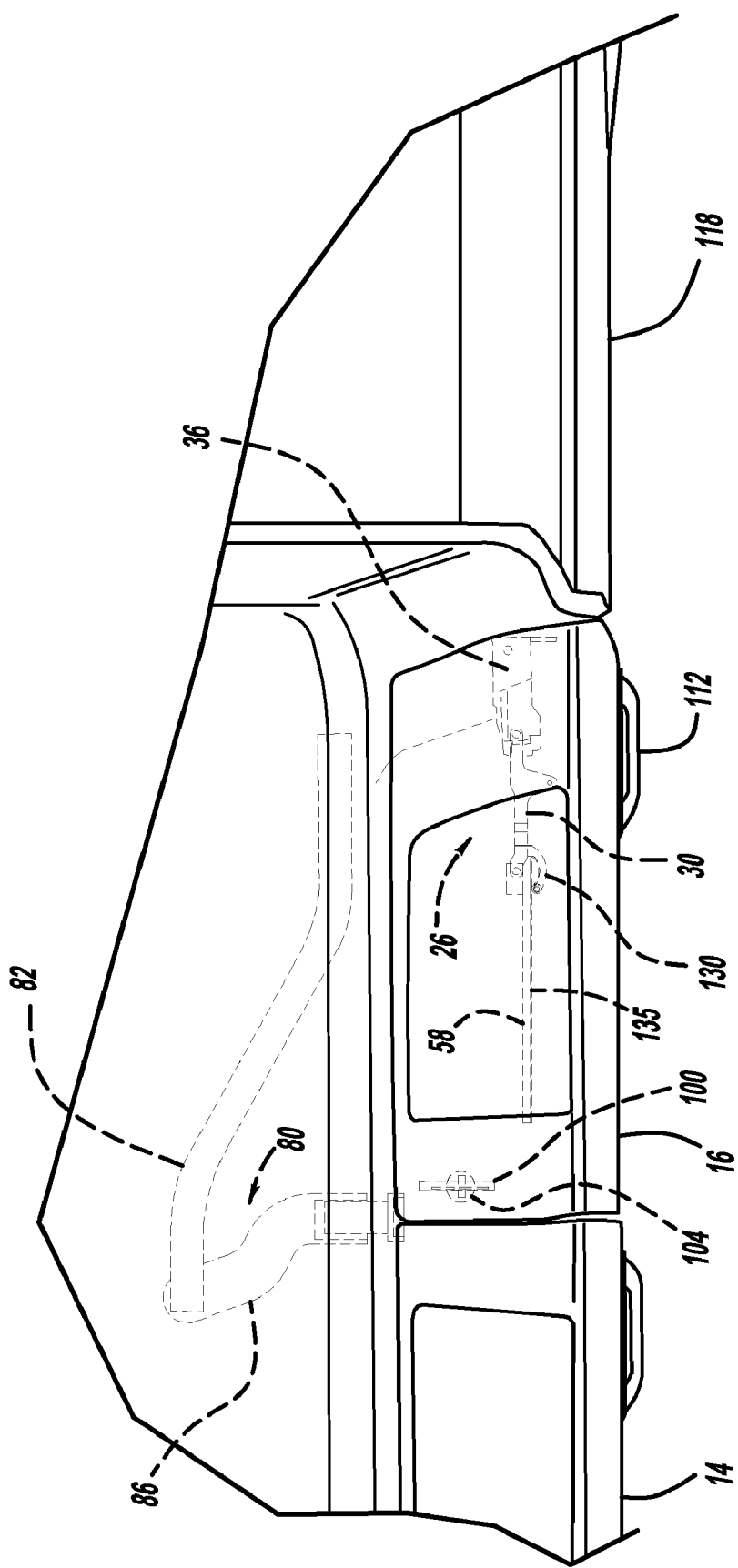
Figure 11B:
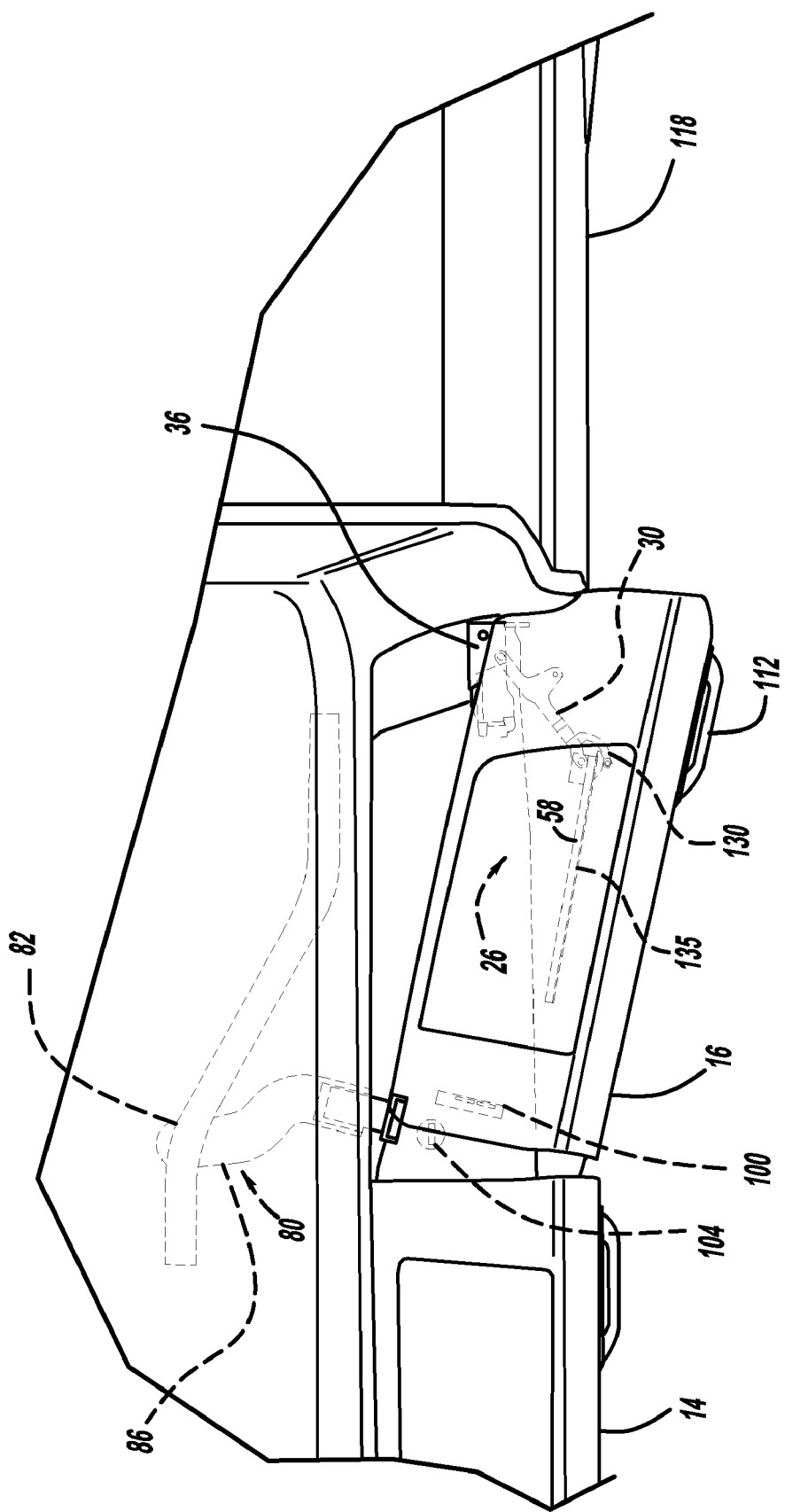
Figure 14A:
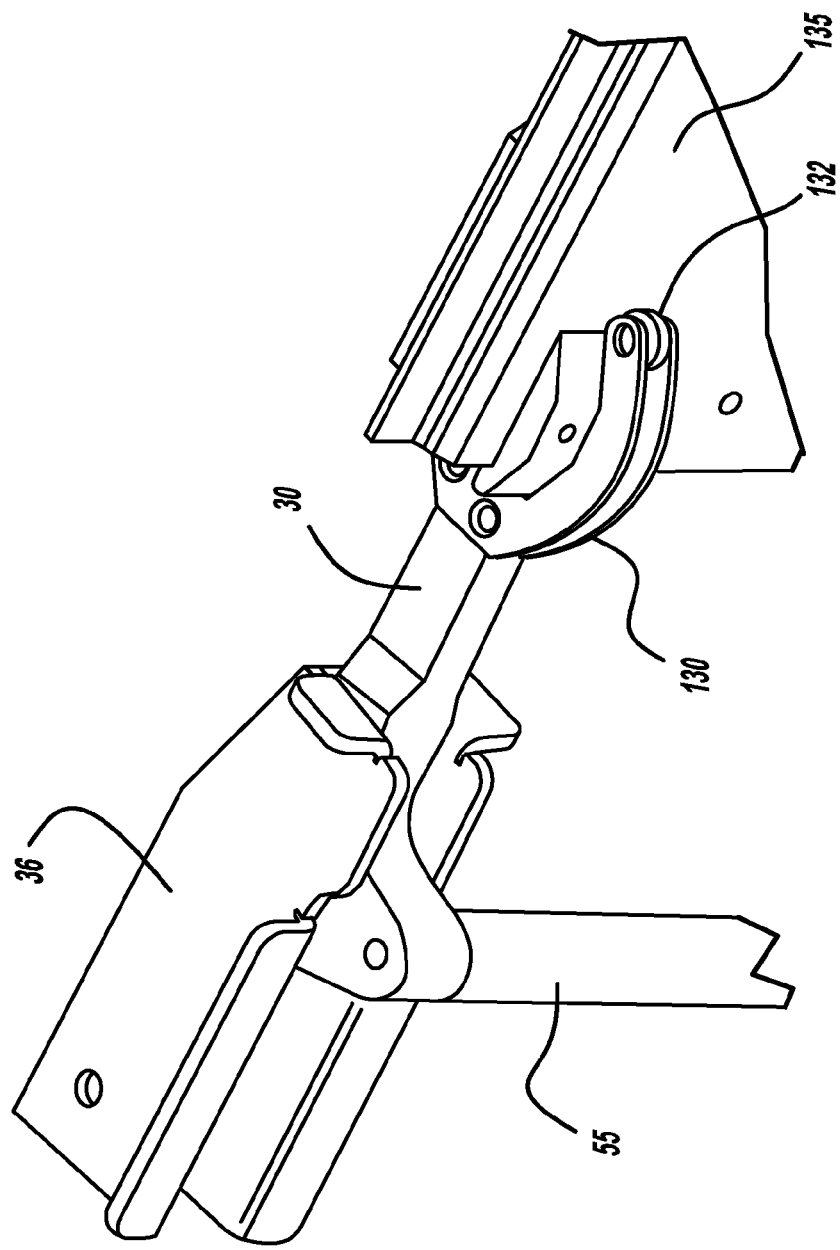
Figure 14B:
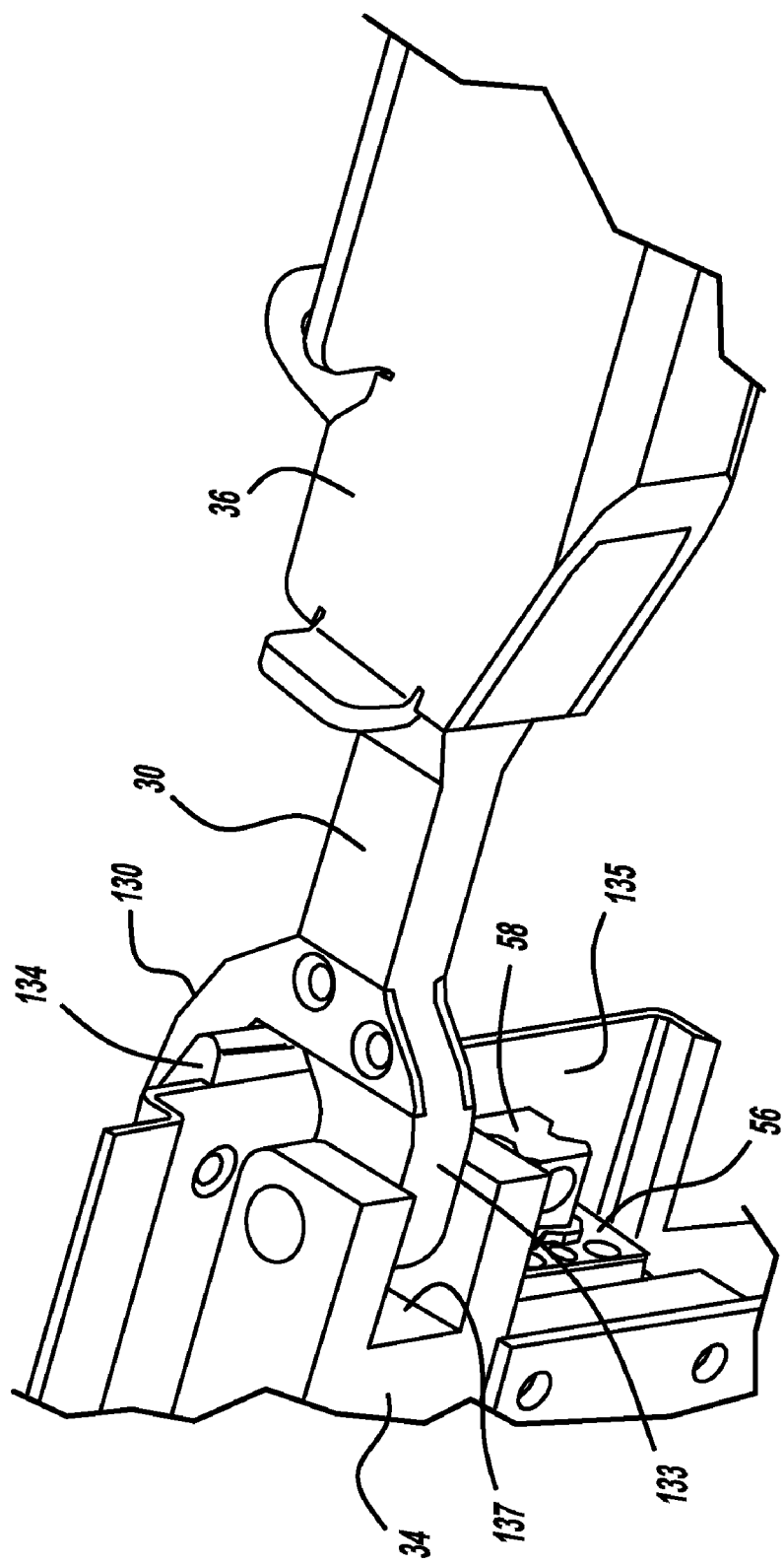
Figure 14D:
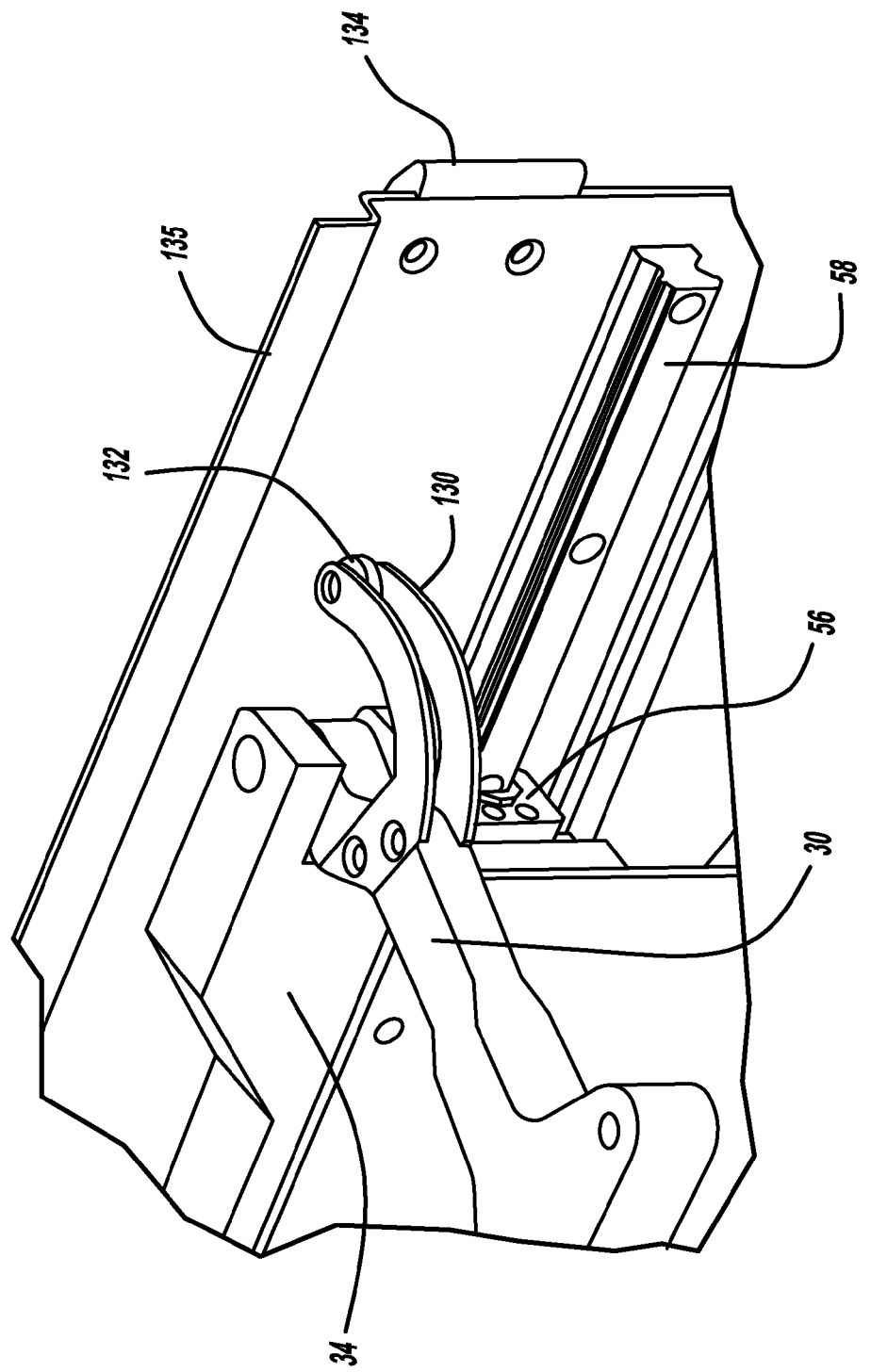
Figure 15A:
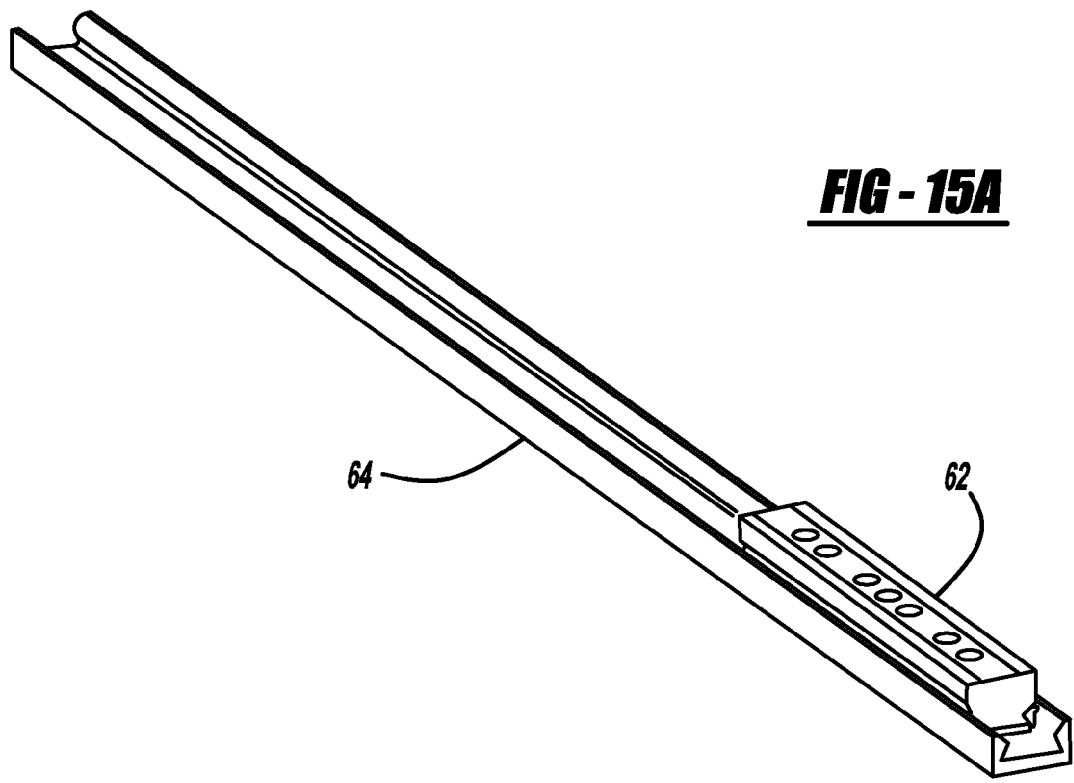
FIGS. 15A and 15B illustrate a first alternative embodiment of slide arrangements for use with the rear door articulating and sliding mechanism of FIG. 1.
Figure 15B:
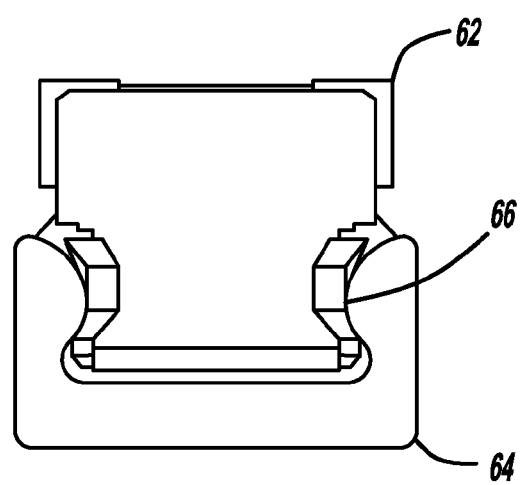
Figure 16A:
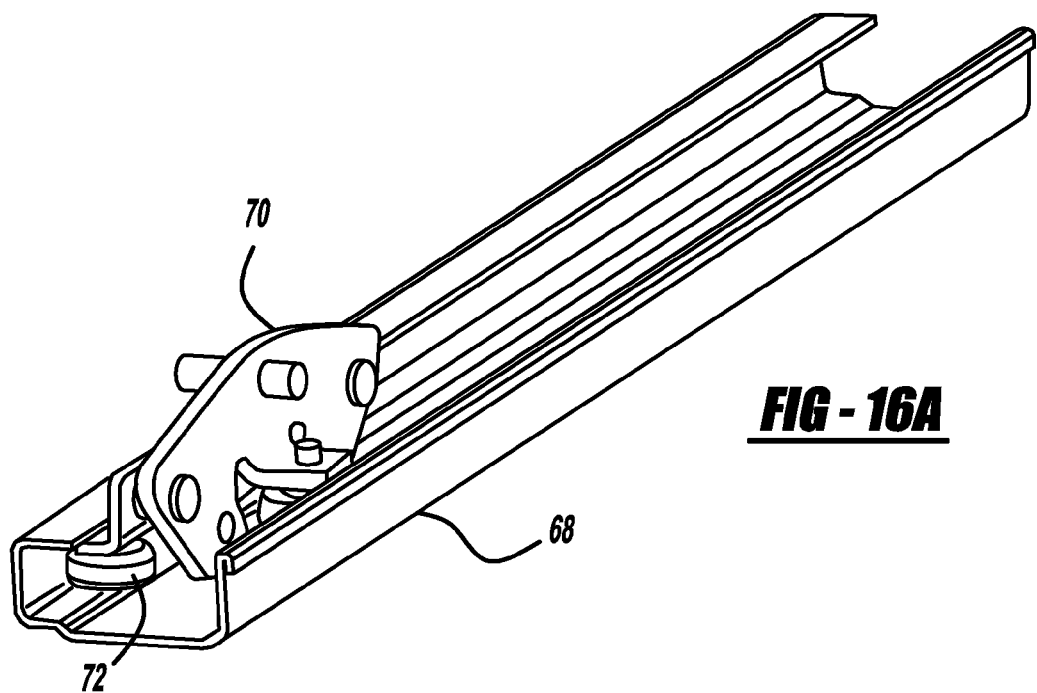
FIGS. 16A and 16B illustrate a second alternative embodiment of slide arrangements for use with the rear door articulating and sliding mechanism of FIG. 1.
Figure 16B:
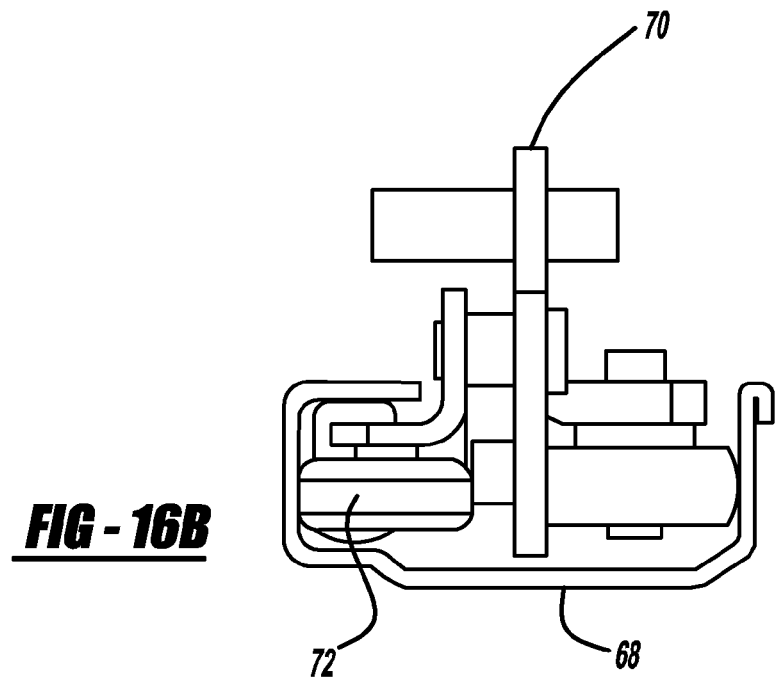

Referring to FIGS. 11A-11D, these figures generally include top views of vehicle 12 with rear door 16 respectively illustrated in a closed, just beginning to open, opened midway and fully opened positions, with front door 14 open. Further, referring to FIGS. 14A-14D, these figures generally illustrate rotation of hinge arm 30 for selectively permitting articulation or sliding of the rear door. As shown in FIGS. 11A, 14A and 14B, in the rear door closed position, hinge arms 30 may be disposed generally parallel to guide tracks 58, and curved check 130 may be engaged with complementary curved detent 134. As rear door 16 is just beginning to open in the FIGS. 11B and 14C configuration, hinge arms 30 may rotate in a counter clockwise direction in the FIGS. 11B and 14C orientation, with guide arm 86 sliding along sections 90, 92 of guide track 82 to articulate the rear end of rear door 16 away from front door 14 and vehicle body 118. In the FIGS. 11B and 14C orientation, roller 132 of curved check 130 may rotate on detent 134, to thus allow rotation of the hinge arm while preventing sliding thereof relative to guide tracks 58. With continued opening of rear door 16 as shown in FIG. 11C, slide blocks 56 may begin to translate relative to guide tracks 58, once pivotal movement of hinge arms 30 is limited at approximately 110° in the embodiment shown relative to the vehicle A-B center line by the contact of surfaces 133, 137 respectively of hinge arm 30 (at section 46; see FIG. 8) and slide block mount 34. At this stage, guide arm 86 may operate to slide along section 94 of guide track 82 to also prevent articulation of rear door 16 and to further allow only sliding movement of door 16 relative to vehicle body 118. Lastly, referring to FIGS. 11D and 14D, from the FIG. 11C to the FIG. 11D positions, rear door 16 may continue to translate parallel to vehicle body 118 with translation of slide blocks 56 on guide tracks 58, with hinge arm 30 maintained in the fixed position of FIG. 11D relative to guide track 58 by means of contact of surfaces 133, 137, and roller 132 of curved check 130 sliding along frame member 135.

Figure 12A:
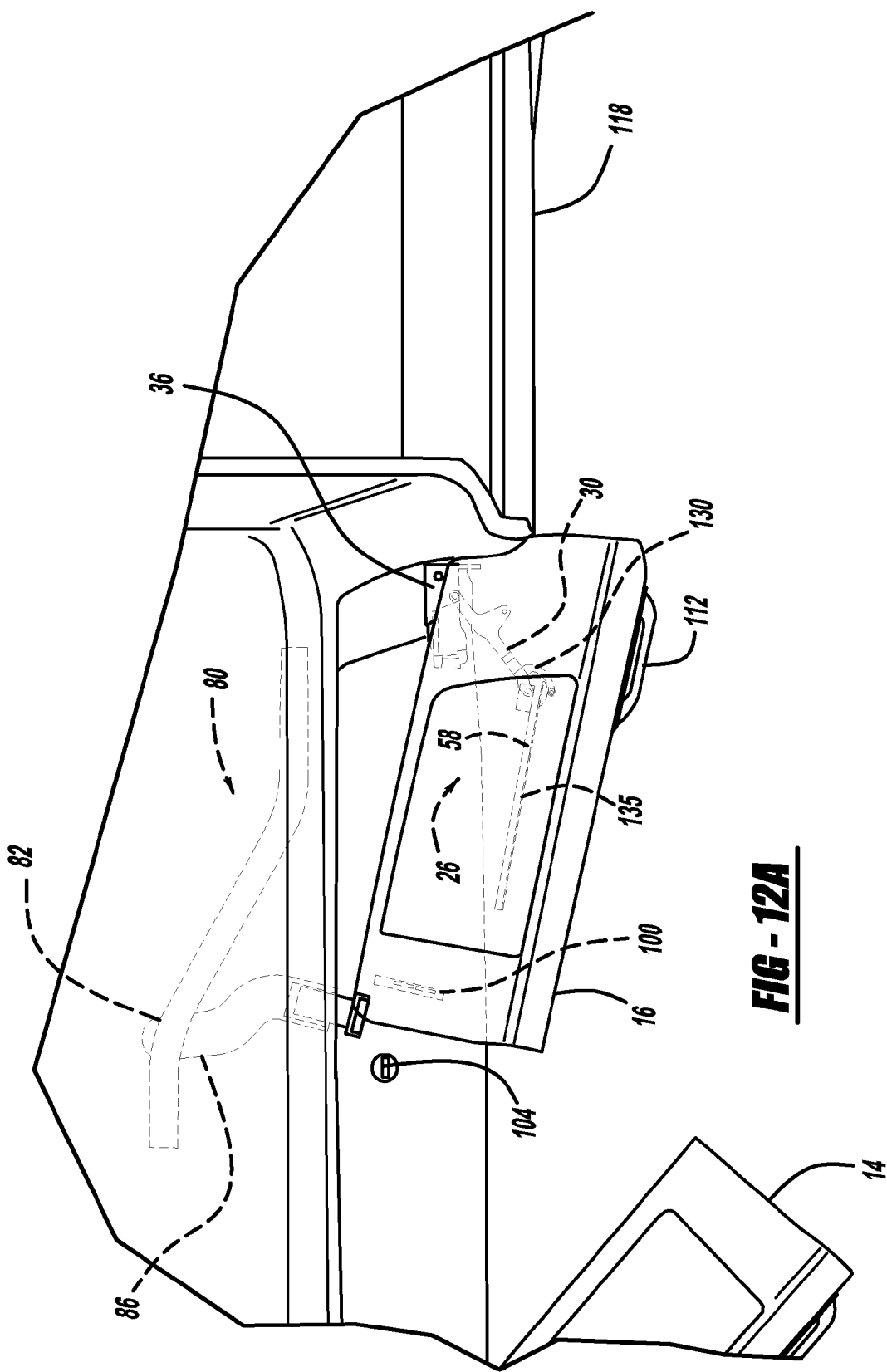
Figure 13A:
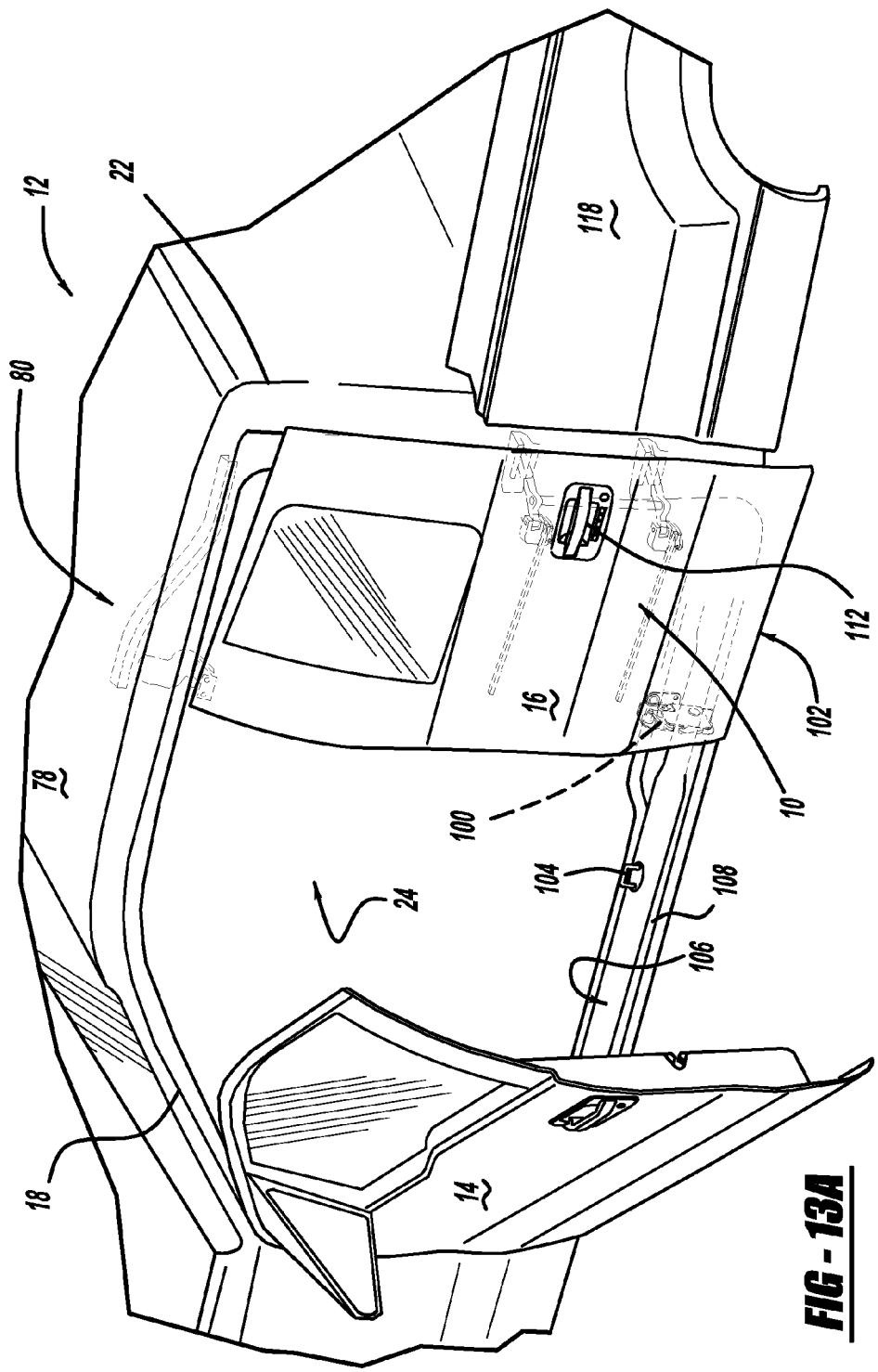
FIGS. 13A and 13B are isometric views of a vehicle including the rear door articulating and sliding mechanism of FIG. 1, respectively illustrating the rear vehicle door in a just beginning to open and fully opened positions, with the front vehicle door open.
Figure 13B:
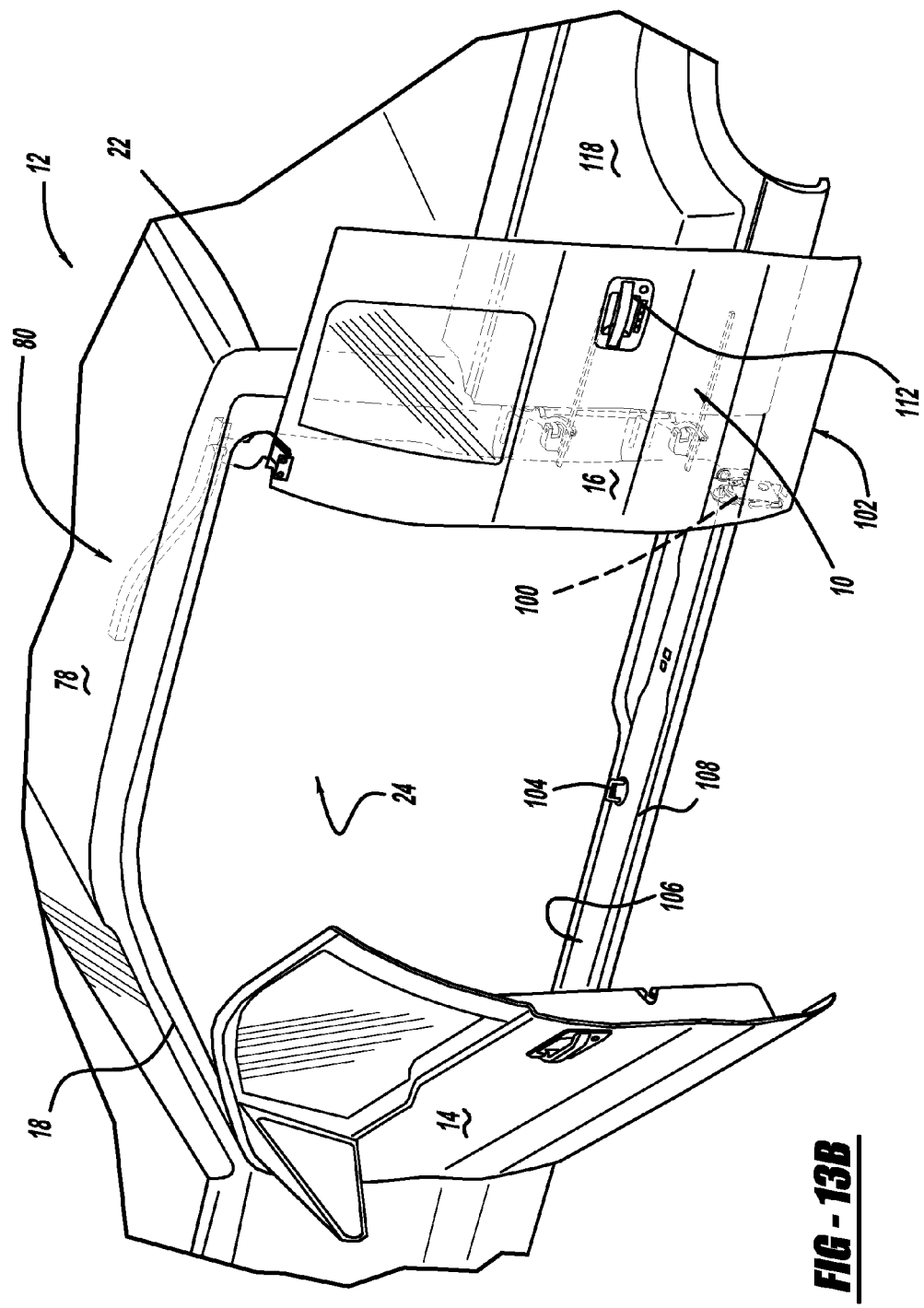

As discussed above, since rear door articulating and sliding mechanism 10 may allow for complete opening of rear door 16, with front door 14 being fully opened or closed, referring to FIGS. 12A, 12B, 13A and 13B, in a similar manner as discussed above with reference to FIGS. 11A-11D, the opening of rear door 16 is illustrated from the just beginning to open position of FIGS. 12A, 13A to the fully opened position of FIGS. 12B, 13B, with front door 14 open.

To summarize, the invention thus provides rear door articulating and sliding mechanism 10 for vehicle rear door articulation, with the system permitting opening and closing of a rear door with or without a front door being opened. The system requires minimal modification of a vehicle structure, in that, components such as hinge mount 36 and guide tracks 58, 82 can be installed by minimal modification to a C-pillar area or the rear door and roof structure. The invention facilitates ease of ingress and egress and allows maximum access for loading and unloading of transportable items. Based on the discussion above, the mode of opening of rear door 16 is not constrained by parking lot restrictions that limit conventional door opening when adjacent to another vehicle or object that prevents full rotation of a conventional hinged door. Thus, parking lot entrapment, which prevents access to the door openings in such situations, is thereby avoided.

Those skilled in the art would readily appreciate in view of this disclosure that various modifications could be made to the aforementioned components, without departing from the scope of the present invention. For example, as discussed above, whereas mechanism 10 has been described and illustrated as including an articulating and sliding hinge assembly 26 including parallel disposed upper and lower hinge arms 30 (see FIGS. 1-3), additional or fewer hinge components (i.e. one or more pairs of hinge arms and related components) may be provided based on the stability and size of the rear door and related components. Further, whereas hinge arms 30 and guide track 82 have been illustrated as including a curved profile for facilitating predetermined articulation and sliding of rear door 16, the curvature of arm 30 or track 82 may be varied as needed for controlling movement of door 16. Yet further, whereas vehicle 12 equipped with mechanism 10 may include a latch 100 disposed at lower end 102 of door 16 engageable with striker 104 provided at lower end 106 of door opening frame 108, additional latches/strikers may be provided at the upper end or other areas of door 16 and door opening frame 108. Further, whereas mechanism 10 has been described as including guide assembly 80, a variety of other mechanisms that selectively allow/prevent articulation or sliding of a door structure may be used in conjunction with or in lieu of assembly 80. Moreover, whereas door 16 has been discussed as being manually operable via handle 112, mechanism 10 may be used with an automatic door 16 operable, for example, by a remote or vehicle mounted push-button. Referring to FIG. 1, whereas upper guide assembly 80 has been illustrated as being mounted to roof structure 78, assembly 80 may also be readily mounted to the vehicle rocker for thus providing a load bearing support during opening/closing of door 16. Yet further, whereas mechanism 10 has been described as being usable with rear door 16 in the exemplary embodiment illustrated, it is readily evident that mechanism 10 may be usable with a vehicle front, middle or other doors, or with a compartment closure (i.e. broadly a vehicle door for the occupant compartment or another compartment for storing objects), or a tailgate assembly, for facilitating the aforedescribed articulating/sliding operation. Moreover, whereas the overall opening/closing of door 16 has been illustrated in FIGS. 11A-11D, one or more intermediate stops may be provided on guide tracks 58, 82 or other components for limiting opening of door 16 at predetermined positions for allowing partial access to compartment 24.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. A vehicle rear door articulating and sliding mechanism comprising:
    at least one articulating hinge assembly including:
        at least one hinge arm pivotally mounted to a vehicle C-pillar at one end thereof;
        a vehicle rear door pivotally and slidably mounted to said hinge arm at an opposite end of said hinge arm;
        at least one door mounted guide track mounted to the vehicle rear door; and
        at least one slide block pivotally mounted to said hinge arm and slidably attached to said door mounted guide track; and
    a guide assembly including at least one of a vehicle roof mounted guide track and a vehicle floor mounted guide track and a guide arm mounted to the vehicle rear door and having a follower slidable relative to said at least one of the vehicle roof mounted guide track and the vehicle floor mounted guide track for facilitating guided movement of the vehicle rear door,
    wherein said hinge arm is disposed at first and second angular positions relative to said door mounted guide track when the vehicle rear door is respectively disposed in closed and opened positions, and said slide block is disposed at first and second positions along a length of said door mounted guide track when the vehicle rear door is respectively disposed in the closed and opened positions, whereby, said vehicle rear door articulating and sliding mechanism provides articulating movement of the vehicle rear door, independent of a vehicle front door, during initial opening thereof and further provides sliding movement of the vehicle rear door relative to the vehicle body during continued opening thereof, wherein said slide block is pivotally mounted to said opposite end of said hinge arm, and wherein the at least one of the vehicle roof mounted guide track and the vehicle floor mounted guide track angles outward such that rotation of the hinge arm and movement of the guide arm in the at least one of the vehicle roof mounted guide track and the vehicle floor mounted guide track causes the rear door to rotate outward about one end and move further into a position parallel to the body of the vehicle.

2. A vehicle rear door articulating and sliding mechanism according to claim 1, wherein a surface of said hinge arm is contiguously engageable with a surface of said slide block to limit pivotal movement of said hinge arm relative to said slide block.

3. A vehicle rear door articulating and sliding mechanism according to claim 1, wherein the at least one of a vehicle roof mounted guide track and a vehicle floor mounted guide track comprises a vehicle, roof mounted guide track.

4. A vehicle rear door articulating and sliding mechanism according to claim 1, wherein the at least one of a vehicle floor mounted guide track and a vehicle floor mounted guide track comprises a vehicle floor mounted guide track.

5. A vehicle rear door articulating and sliding mechanism according to claim 1, further comprising a tie-rod connected to an upper and lower hinge arm for thereby providing rigidity for simultaneous operation of upper and lower hinge assemblies.

6. A vehicle rear door articulating and sliding mechanism according to claim 1, wherein said opposite end of said hinge arm further includes a fixedly mounted curved check engageable with a complementary curved detent provided on the vehicle rear door for preventing sliding movement of the vehicle rear door during articulating movement of the vehicle rear door, and wherein said curved check is rotated about the curved detent to a location below the curved detent such that the curved check is disengageable from said complementary curved detent for allowing sliding movement of the vehicle rear door and preventing articulating movement of the vehicle rear door.

7. A vehicle rear door articulating and sliding mechanism according to claim 6, wherein said curved check includes a roller engageable with said complementary curved detent.

8. A vehicle door articulating and sliding mechanism comprising:
    at least one articulating hinge assembly including:
        at least one hinge arm pivotally mounted to a vehicle body structure at one end thereof;
        a vehicle door pivotally and slidably mounted to said hinge arm at an opposite end of said hinge arm;
        at least one door mounted guide track mounted to the vehicle door; and
        at least one slide block pivotally mounted to said hinge arm and slidably attached to said door mounted guide track; and
    a guide assembly including at least one of a vehicle roof mounted guide track and a vehicle floor mounted guide track and guide arm mounted to the vehicle door and having a follower slidable relative to said at least one of the vehicle roof mounted guide track and floor mounted guide track for facilitating guided movement of the vehicle door;
    wherein said hinge arm is disposed at first and second angular positions relative to said door mounted guide track when the vehicle door is respectively disposed in closed and opened positions, and said slide block is disposed at first and second positions along a length of said door mounted guide track when the vehicle door is respectively disposed in the closed and opened positions, whereby, said vehicle door articulating and sliding mechanism provides articulating movement of the vehicle door during initial opening thereof and further provides sliding movement of the vehicle door relative to the vehicle body during continued opening thereof, wherein said slide block is pivotally mounted to said opposite end of said hinge arm, and wherein the at least one of the vehicle roof mounted guide track and the vehicle floor mounted guide track angles outward such that rotation of the hinge arm and movement of the guide arm in the at least one of the vehicle roof mounted guide track and the vehicle floor mounted guide track causes the door to rotate outward about one end and move further into a position parallel to the body of the vehicle.

9. A vehicle door articulating and sliding mechanism according to claim 8, wherein said mechanism provides articulating movement of the vehicle door, independent of a vehicle adjacent door.

10. A vehicle door articulating and sliding mechanism according to claim 8, wherein a surface of said hinge arm is contiguously engageable with a surface of said slide block to limit pivotal movement of said hinge arm relative to said slide block.

11. A vehicle door articulating and sliding mechanism according to claim 8, wherein the at least one of a vehicle roof mounted guide track and a vehicle floor mounted guide track comprises a vehicle roof mounted guide track.

12. A vehicle door articulating and sliding mechanism according to claim 8, wherein the at least one of a vehicle floor mounted guide track and a vehicle floor mounted guide track comprises a vehicle floor mounted guide track.

13. A vehicle door articulating and sliding mechanism according to claim 8, further comprising a tie-rod connected to an upper and lower hinge arm for thereby providing rigidity for simultaneous operation of upper and lower hinge assemblies.

14. A vehicle door articulating and sliding mechanism according to claim 8, wherein said opposite end of said hinge arm further includes a fixedly mounted curved check engageable with a complementary curved detent provided on the vehicle door for preventing sliding movement of the vehicle door during articulating movement of the vehicle door, and wherein said curved check is rotated about the curved detent to a location below the curved detent such that the curved check is disengageable from said complementary curved detent for allowing sliding movement of the vehicle door and preventing articulating movement of the vehicle door.

15. A vehicle door articulating and sliding mechanism according to claim 14, wherein said curved check includes a roller engageable with said complementary curved detent.

16. A vehicle compartment closure articulating and sliding mechanism comprising:
at least one articulating hinge assembly including:
at least one hinge arm pivotally mounted to a vehicle body structure at one end thereof;
a compartment closure pivotally and slidably mounted to said hinge arm at an opposite end of said hinge arm;
at least one compartment closure mounted guide track mounted to the compartment closure; and
a guide assembly including at least one of a vehicle roof mounted guide track and a vehicle floor mounted guide track and a guide arm mounted to the compartment closure and having a follower slidable relative to said at least one of the vehicle roof mounted guide track and the vehicle floor mounted guide track for facilitating guided movement of the compartment closure,
at least one slide block pivotally mounted to said hinge arm and slidably attached to said compartment closure mounted guide track,
wherein said hinge arm is disposed at first and second angular positions relative to said compartment closure mounted guide track when the compartment closure is respectively disposed in closed and opened positions, and said slide block is disposed at first and second positions along a length of said compartment closure mounted guide track when the compartment closure is respectively disposed in the closed and opened positions, whereby, said compartment closure articulating and sliding mechanism provides articulating movement of the compartment closure during initial opening thereof and further provides sliding movement of the compartment closure relative to a vehicle body structure during continued opening thereof, wherein said slide block is pivotally mounted to said opposite end of said hinge arm, and wherein the at least one of the vehicle roof mounted guide track and the vehicle floor mounted guide track angles outward such that rotation of the hinge arm and movement of the guide arm in the at least one of the vehicle roof mounted guide track and the vehicle floor mounted guide track causes the compartment closure to rotate outward about one end and move further into a position parallel to the body of the vehicle.

17. A vehicle compartment closure articulating and sliding mechanism according to claim 16, wherein a surface of said hinge arm is contiguously engageable with a surface of said slide block to limit pivotal movement of said hinge arm relative to said slide block.

18. A vehicle compartment closure articulating and sliding mechanism according to claim 16, further comprising a tie-rod connected to parallel hinge arms for thereby providing rigidity for simultaneous operation of parallel hinge assemblies.

19. A vehicle compartment closure articulating and sliding mechanism according to claim 16, wherein said opposite end of said hinge arm further includes a fixedly mounted curved check engageable with a complementary curved detent provided on the compartment closure for preventing sliding movement of the compartment closure during articulating movement of the compartment closure, and wherein said curved check is rotated about the curved detent to a location below the curved detent such that the curved check is disengageable from said complementary curved detent for allowing sliding movement of the compartment closure and preventing articulating movement of the compartment closure.

20. A vehicle compartment closure articulating and sliding mechanism according to claim 19, wherein said curved check includes a roller engageable with said complementary curved detent.

21. A door mechanism comprising:
a hinge assembly including a hinge arm pivotally and slidably mounted to a door; and
a guide assembly including at least one of a vehicle roof mounted guide track and a vehicle floor mounted guide track angled outward and a guide arm mounted thereto, wherein the guide track and the hinge arm cause the door to rotate outward at one end and then slide into a position parallel to the vehicle.

* * * * *